(12) United States Patent
Mahacek et al.

(10) Patent No.: US 8,930,263 B1
(45) Date of Patent: Jan. 6, 2015

(54) CREDIT DATA ANALYSIS

(71) Applicant: ConsumerInfo.com, Inc., Costa Mesa, CA (US)

(72) Inventors: Jeffrey Bryan Mahacek, Costa Mesa, CA (US); Janice Anne Rohn, Redondo Beach, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

(21) Appl. No.: 13/826,118

(22) Filed: Mar. 14, 2013

Related U.S. Application Data

(60) Provisional application No. 61/732,244, filed on Nov. 30, 2012.

(51) Int. Cl.
| | | |
|---|---|---|
| *G06Q 40/00* | (2012.01) | |
| *G06Q 40/02* | (2012.01) | |
| *G06Q 30/02* | (2012.01) | |
| *G06F 17/00* | (2006.01) | |

(52) U.S. Cl.
CPC .............. *G06Q 40/025* (2013.01); *G06Q 30/02* (2013.01); *G06Q 40/00* (2013.01); *G06F 17/60* (2013.01)
USPC ..................... 705/38; 705/35; 705/4; 715/854

(58) Field of Classification Search
CPC ....... G06Q 40/00; G06Q 40/02; G06Q 30/02; G06Q 3/48; G06F 17/60
USPC ................................... 705/4, 35, 38; 715/854
See application file for complete search history.

(56) References Cited

U.S. PATENT DOCUMENTS

| | | |
|---|---|---|
| 3,316,395 A | 4/1967 | Lavin et al. |
| 4,736,294 A | 4/1988 | Gill |

(Continued)

FOREIGN PATENT DOCUMENTS

| | | |
|---|---|---|
| EP | 0 869 652 | 10/1998 |
| EP | 0 913 789 | 5/1999 |

(Continued)

OTHER PUBLICATIONS

Awoonor-Williams, P. (2004). Gender and credit: An analysis of women's experience in the credit market. (Order No. 3147520, Howard University). ProQuest Dissertations and Theses 136-136 p. Retrieved from http://search.proquest.com/docview/305196845?accountid=14753. (305196845).*

(Continued)

*Primary Examiner* — Muriel Tinkler
(74) *Attorney, Agent, or Firm* — Knobbe, Martens, Olson & Bear LLP

(57) ABSTRACT

A computer system receives credit information relating to a consumer and a number of high scorers, and determines credit score factors associated with the consumer and the high scorers. The system may construct flippable score factor displays comprising consumer specific information specific to a credit category that may be reversed to display explanatory text regarding how that credit category affects their credit report. The score factor display may include a comparison between the consumer's scores and the high scorers' scores in a number of categories. Scores of high scorers may be periodically refreshed. Additionally, the group of high scorers may be limited according to a particular demographic, such as a geographic location, that may be selectable by a user.

22 Claims, 6 Drawing Sheets

(56) References Cited

U.S. PATENT DOCUMENTS

| | | |
|---|---|---|
| 4,812,628 A | 3/1989 | Boston et al. |
| 4,876,592 A | 10/1989 | Von Kohorn |
| 4,895,518 A | 1/1990 | Arnold |
| 4,947,028 A | 8/1990 | Gorog |
| 5,034,807 A | 7/1991 | Von Kohorn |
| 5,201,010 A | 4/1993 | Deaton et al. |
| 5,259,766 A | 11/1993 | Sack |
| 5,262,941 A | 11/1993 | Saladin |
| 5,274,547 A | 12/1993 | Zoffel et al. |
| 5,611,052 A | 3/1997 | Dykstra et al. |
| 5,615,408 A | 3/1997 | Johnson |
| 5,704,029 A | 12/1997 | Wright, Jr. |
| 5,732,400 A | 3/1998 | Mandler |
| 5,774,883 A | 6/1998 | Andersen |
| 5,793,972 A | 8/1998 | Shane |
| 5,875,236 A | 2/1999 | Jankowitz |
| 5,878,403 A | 3/1999 | DeFrancesco |
| 5,884,287 A | 3/1999 | Edesess |
| 5,930,764 A | 7/1999 | Melchione et al. |
| 5,930,776 A | 7/1999 | Dykstra et al. |
| 5,940,812 A | 8/1999 | Tengel |
| 5,950,172 A | 9/1999 | Klingman |
| 5,966,695 A | 10/1999 | Melchione et al. |
| 5,978,780 A | 11/1999 | Watson |
| 5,995,947 A | 11/1999 | Fraser et al. |
| 6,029,149 A | 2/2000 | Dykstra et al. |
| 6,064,987 A | 5/2000 | Walker |
| 6,070,141 A | 5/2000 | Houvener |
| 6,088,686 A | 7/2000 | Walker et al. |
| 6,094,643 A | 7/2000 | Anderson et al. |
| 6,105,007 A | 8/2000 | Norris |
| 6,115,690 A | 9/2000 | Wong |
| 6,128,599 A | 10/2000 | Walker |
| 6,128,603 A | 10/2000 | Dent |
| 6,185,543 B1 | 2/2001 | Galperin et al. |
| 6,202,053 B1 | 3/2001 | Christiansen et al. |
| 6,208,979 B1 | 3/2001 | Sinclair |
| 6,236,977 B1 | 5/2001 | Verba et al. |
| 6,249,770 B1 | 6/2001 | Erwin et al. |
| 6,311,169 B2 | 10/2001 | Duhon |
| 6,324,524 B1 | 11/2001 | Lent et al. |
| 6,330,575 B1 | 12/2001 | Moore |
| 6,405,173 B1 | 6/2002 | Honarvar |
| 6,405,181 B2 | 6/2002 | Lent et al. |
| 6,513,018 B1 | 1/2003 | Culhane |
| 6,567,791 B2 | 5/2003 | Lent |
| 6,611,816 B2 | 8/2003 | Lebda et al. |
| 6,622,131 B1 | 9/2003 | Brown et al. |
| 6,658,393 B1 | 12/2003 | Basch et al. |
| 6,901,406 B2 | 5/2005 | Nabe et al. |
| 6,950,807 B2 | 9/2005 | Brock |
| 6,959,281 B1 | 10/2005 | Freeling et al. |
| 6,962,336 B2 | 11/2005 | Glass |
| 6,988,085 B2 | 1/2006 | Hedy |
| 7,076,462 B1 | 7/2006 | Nelson et al. |
| 7,076,475 B2 | 7/2006 | Honarvar |
| 7,143,063 B2 | 11/2006 | Lent et al. |
| 7,181,418 B1 | 2/2007 | Zucker et al. |
| 7,249,076 B1 | 7/2007 | Pendleton et al. |
| 7,275,083 B1 | 9/2007 | Seibel et al. |
| 7,280,980 B1 | 10/2007 | Hoadley et al. |
| 7,315,837 B2 | 1/2008 | Sloan et al. |
| 7,337,133 B1 | 2/2008 | Bezos et al. |
| 7,337,468 B2 | 2/2008 | Metzger |
| 7,356,516 B2 | 4/2008 | Richey et al. |
| 7,366,694 B2 | 4/2008 | Lazerson |
| 7,409,369 B1 | 8/2008 | Homuth et al. |
| 7,472,088 B2 | 12/2008 | Taylor et al. |
| 7,475,032 B1 | 1/2009 | Patnode et al. |
| 7,505,939 B2 | 3/2009 | Lent et al. |
| 7,542,993 B2 | 6/2009 | Satterfield et al. |
| 7,552,086 B1 | 6/2009 | Rajasekar et al. |
| 7,571,139 B1 | 8/2009 | Giordano et al. |
| 7,580,856 B1 | 8/2009 | Pliha |
| 7,590,589 B2 | 9/2009 | Hoffberg |
| 7,593,889 B2 | 9/2009 | Raines et al. |
| 7,593,891 B2 | 9/2009 | Kornegay et al. |
| 7,610,229 B1 | 10/2009 | Kornegay |
| 7,610,257 B1 | 10/2009 | Abrahams |
| 7,653,592 B1 | 1/2010 | Flaxman et al. |
| 7,711,635 B2 | 5/2010 | Steele et al. |
| 7,711,636 B2 | 5/2010 | Robida et al. |
| 7,747,559 B2 | 6/2010 | Leitner et al. |
| 7,756,789 B2 | 7/2010 | Welker et al. |
| 7,792,715 B1 | 9/2010 | Kasower |
| 7,814,004 B2 | 10/2010 | Haggerty et al. |
| 7,814,005 B2 | 10/2010 | Imrey et al. |
| 7,818,228 B1 | 10/2010 | Coulter |
| 7,840,484 B2 | 11/2010 | Haggerty et al. |
| 7,877,304 B1 | 1/2011 | Coulter |
| 7,890,420 B2 | 2/2011 | Haggerty et al. |
| 7,904,306 B2 | 3/2011 | Johnson et al. |
| 7,925,582 B1 | 4/2011 | Kornegay et al. |
| 7,962,404 B1 | 6/2011 | Metzger, II et al. |
| 7,970,679 B2 | 6/2011 | Kasower |
| 7,991,689 B1 | 8/2011 | Brunzell et al. |
| 8,001,042 B1 | 8/2011 | Brunzell et al. |
| 8,015,107 B2 | 9/2011 | Kornegay et al. |
| 8,036,979 B1 | 10/2011 | Torrez et al. |
| 8,073,768 B2 | 12/2011 | Haggerty et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,195,549 B2 | 6/2012 | Kasower |
| 8,315,943 B2 | 11/2012 | Torrez et al. |
| 8,321,334 B1 | 11/2012 | Kornegay et al. |
| 8,335,741 B2 | 12/2012 | Kornegay et al. |
| 8,364,588 B2 | 1/2013 | Celka et al. |
| 2001/0039523 A1 | 11/2001 | Iwamoto |
| 2001/0049672 A1 | 12/2001 | Moore et al. |
| 2002/0010616 A1 | 1/2002 | Itzhaki |
| 2002/0023051 A1 | 2/2002 | Kunzle et al. |
| 2002/0032645 A1 | 3/2002 | Nozaki et al. |
| 2002/0032647 A1 | 3/2002 | Delinsky et al. |
| 2002/0035511 A1 | 3/2002 | Haji et al. |
| 2002/0059139 A1 | 5/2002 | Evans |
| 2002/0077964 A1 | 6/2002 | Brody et al. |
| 2002/0111890 A1 | 8/2002 | Sloan et al. |
| 2002/0128960 A1 | 9/2002 | Lambiotte et al. |
| 2002/0173994 A1 | 11/2002 | Ferguson, III |
| 2002/0198824 A1 | 12/2002 | Cook |
| 2003/0018549 A1 | 1/2003 | Fei et al. |
| 2003/0028466 A1 | 2/2003 | Jenson et al. |
| 2003/0028477 A1 | 2/2003 | Stevenson et al. |
| 2003/0033242 A1 | 2/2003 | Lynch et al. |
| 2003/0041031 A1 | 2/2003 | Hedy |
| 2003/0065563 A1 | 4/2003 | Elliott et al. |
| 2003/0154162 A1 | 8/2003 | Danaher et al. |
| 2003/0163435 A1 | 8/2003 | Payone |
| 2003/0208412 A1 | 11/2003 | Hillestad et al. |
| 2003/0212654 A1 | 11/2003 | Harper et al. |
| 2003/0216965 A1 | 11/2003 | Libman |
| 2003/0229580 A1* | 12/2003 | Gass et al. ................ 705/38 |
| 2003/0233323 A1 | 12/2003 | Bilski et al. |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0107125 A1 | 6/2004 | Guheen et al. |
| 2004/0111292 A1 | 6/2004 | Hutchins |
| 2004/0111359 A1 | 6/2004 | Hudock |
| 2004/0128230 A1 | 7/2004 | Oppenheimer et al. |
| 2004/0138995 A1 | 7/2004 | Hershkowitz et al. |
| 2004/0158521 A1 | 8/2004 | Newton |
| 2004/0163101 A1 | 8/2004 | Swix |
| 2004/0186807 A1 | 9/2004 | Nathans et al. |
| 2004/0199456 A1 | 10/2004 | Flint et al. |
| 2004/0230534 A1 | 11/2004 | McGough |
| 2004/0243508 A1 | 12/2004 | Samson et al. |
| 2005/0027632 A1 | 2/2005 | Zeitoun et al. |
| 2005/0154664 A1 | 7/2005 | Guy et al. |
| 2005/0251820 A1 | 11/2005 | Stefanik et al. |
| 2006/0004731 A1 | 1/2006 | Seibel et al. |
| 2006/0041443 A1 | 2/2006 | Horvath |
| 2006/0080233 A1 | 4/2006 | Mendelovich et al. |

(56) References Cited

U.S. PATENT DOCUMENTS

| | | |
|---|---|---|
| 2006/0080251 A1 | 4/2006 | Fried et al. |
| 2006/0155639 A1 | 7/2006 | Lynch et al. |
| 2006/0178971 A1 | 8/2006 | Owen et al. |
| 2006/0223043 A1 | 10/2006 | Dancy-Edwards et al. |
| 2006/0233332 A1 | 10/2006 | Toms |
| 2006/0242039 A1 | 10/2006 | Haggerty et al. |
| 2006/0242046 A1 | 10/2006 | Haggerty et al. |
| 2006/0242050 A1 | 10/2006 | Haggerty et al. |
| 2006/0282359 A1 | 12/2006 | Nobili et al. |
| 2007/0016500 A1 | 1/2007 | Chatterji et al. |
| 2007/0016501 A1 | 1/2007 | Chatterji et al. |
| 2007/0067206 A1 | 3/2007 | Haggerty et al. |
| 2007/0078741 A1 | 4/2007 | Haggerty et al. |
| 2007/0094137 A1 | 4/2007 | Phillips et al. |
| 2007/0100719 A1 | 5/2007 | Chwast et al. |
| 2007/0112668 A1 | 5/2007 | Celano et al. |
| 2007/0156554 A1 | 7/2007 | Nikoley et al. |
| 2007/0192165 A1 | 8/2007 | Haggerty et al. |
| 2007/0220003 A1 | 9/2007 | Chern et al. |
| 2007/0226130 A1 | 9/2007 | Haggerty et al. |
| 2007/0233591 A1 | 10/2007 | Newton |
| 2007/0244732 A1 | 10/2007 | Chatterji et al. |
| 2007/0260539 A1 | 11/2007 | Delinsky |
| 2007/0282736 A1 | 12/2007 | Conlin et al. |
| 2007/0288271 A1 | 12/2007 | Klinkhammer |
| 2007/0288338 A1 | 12/2007 | Hoadley |
| 2007/0288360 A1 | 12/2007 | Seeklus |
| 2007/0299770 A1 | 12/2007 | Delinsky |
| 2007/0299771 A1 | 12/2007 | Brody |
| 2008/0021802 A1 | 1/2008 | Pendleton |
| 2008/0059317 A1 | 3/2008 | Chandran et al. |
| 2008/0086400 A1 | 4/2008 | Ardelean et al. |
| 2008/0120155 A1 | 5/2008 | Pliha |
| 2008/0133322 A1 | 6/2008 | Kalia et al. |
| 2008/0140507 A1 | 6/2008 | Hamlisch et al. |
| 2008/0222015 A1 | 9/2008 | Megdal et al. |
| 2008/0228635 A1 | 9/2008 | Megdal et al. |
| 2008/0255897 A1 | 10/2008 | Megdal et al. |
| 2008/0270294 A1 | 10/2008 | Lent et al. |
| 2008/0270295 A1 | 10/2008 | Lent et al. |
| 2008/0294540 A1 | 11/2008 | Celka et al. |
| 2009/0018996 A1 | 1/2009 | Hunt et al. |
| 2009/0048957 A1 | 2/2009 | Celano |
| 2009/0112650 A1 | 4/2009 | Iwane |
| 2009/0280467 A1 | 11/2009 | Ahart |
| 2010/0009320 A1 | 1/2010 | Wilkelis |
| 2010/0023434 A1 | 1/2010 | Bond |
| 2010/0030677 A1 | 2/2010 | Melik-Aslanian et al. |
| 2010/0036697 A1 | 2/2010 | Kelnar |
| 2010/0223168 A1 | 9/2010 | Haggerty et al. |
| 2010/0299251 A1 | 11/2010 | Thomas |
| 2010/0299252 A1 | 11/2010 | Thomas |
| 2010/0299260 A1 | 11/2010 | Thomas |
| 2010/0324986 A1 | 12/2010 | Thomas |
| 2010/0325036 A1 | 12/2010 | Thomas |
| 2011/0004514 A1 | 1/2011 | Thomas |
| 2011/0004546 A1 | 1/2011 | Thomas |
| 2011/0029427 A1 | 2/2011 | Haggerty et al. |
| 2011/0060673 A1 | 3/2011 | Delinsky et al. |
| 2011/0112950 A1 | 5/2011 | Haggerty et al. |
| 2011/0166988 A1 | 7/2011 | Coulter |
| 2011/0184838 A1 | 7/2011 | Winters et al. |
| 2011/0213641 A1 | 9/2011 | Metzger, II et al. |
| 2011/0295733 A1 | 12/2011 | Megdal et al. |
| 2012/0095894 A1 | 4/2012 | Campbell et al. |
| 2012/0123931 A1 | 5/2012 | Megdal et al. |
| 2012/0158574 A1 | 6/2012 | Brunzell et al. |
| 2012/0265661 A1 | 10/2012 | Megdal et al. |
| 2012/0278767 A1* | 11/2012 | Stibel et al. ............ 715/854 |
| 2013/0080315 A1 | 3/2013 | Torrez et al. |
| 2013/0332341 A1* | 12/2013 | Papadimitriou ........... 705/38 |

FOREIGN PATENT DOCUMENTS

| | | |
|---|---|---|
| EP | 1 122 664 | 8/2001 |
| JP | 2003-016261 | 1/2003 |
| WO | WO 99/04350 | 1/1999 |
| WO | WO 99/46710 | 9/1999 |
| WO | WO 00/11574 | 3/2000 |
| WO | WO 01/57720 | 8/2001 |
| WO | WO 01/75754 | 10/2001 |
| WO | WO 03/101123 | 12/2003 |
| WO | WO 2004/114160 | 12/2004 |
| WO | WO 2005/022348 | 3/2005 |
| WO | WO 2006/099492 | 9/2006 |
| WO | WO 2007/149941 | 12/2007 |
| WO | WO 2008/147918 | 12/2008 |

OTHER PUBLICATIONS

Lund, G. (2004, 05). Credit bureau data: Maximising the benefits. Credit Management, 44-45. Retrieved from http://search.proquest.com/docview/228305141?accountid=14753.*

CreditXpert, http://www.creditxpert.com/Products/individuals.asp printed Oct. 12, 2012 in 1 page.

Collins, Michael J.; Exploring the Design of Financial Counseling for Mortgage Borrowers in Default, Journal of Family and Economic Issues, Springer Science+Business Media, pp. 207-226, Mar. 13, 2007.

CreditAnalyst, Digital Matrix Systems, as printed out Mar. 4, 2008, pp. 2.

CreditToolkit, Digital Matrix Systems, as printed out Mar. 4, 2008, pp. 2.

Credit Plus, Inc.; "Score Wizard" [online] [retrieved on Jun. 13, 2007] Retrieved from the internet http://web.archive.org/web/20030806080310/www.creditplus.com/scorewizard.asp Nov. 27, 2002 & Mar. 23, 2003.

CreditXpert Inc., CreditExpert 3-Bureau Comparison™ ,[online] [retrieved on Jun. 7, 2005] Retrieved from the internet http://www.creditxpert.com/CreditXpert%203-Bureau%20Comparison(TM)%20sample.pdf, 2002.

CreditXpert Inc., CreditXpert Credit Score & Analysis, [online] [retrieved on Jun. 7, 2005] Retrieved from the internet http://www.credit.xpert.com/CreditXpert%20Score%20&%20Analysis20and%20Credit%20Wizard%20sample.pdf, 2002.

CreditXpert Inc., CreditXpert Essentials™, Advisor View-Experian Jul. 7, 2003, [online] [retrieved on Nov. 29, 2004] Retrieved from the internet http://www.creditxpert.com/cx_ess_app.pdf, 2004.

CreditXpert Inc., CreditXpert Essentials™, Advisor View-TransUnion, [online] [retrieved on Jun. 7, 2005] Retrieved from the internet http://www.creditxpert.com/cx_ess_app.pdf, 2004.

CreditXpert Inc., CreditXpert Essentials™, Applicant View, [online] [retrieved on Jun. 7, 2005] Retrieved from the internet http://www.creditxpert.com/cx_ess_app.pdf, 2004.

CreditXpert Inc., CreditXpert What-If Simulator™, [online] [retrieved on Jun. 7, 2005] Retrieved from the internet http://www.creditxpert.com/CreditXpert%20What-If%20Simulator(TM)%20sample.pdf, 2002.

"Debt Settlement: Watch Video on how to Pay Your Debt Faster", http://www.debtcansolidationcare.com/debt-settlement.html printed Jan. 9, 2013 in 6 pages.

Demby, Elayne, "Special Report: Letting Consumers Know the Score—and More", Collections and Credit Risk, New York, Feb. 2003, vol. 8, Issue 2, pp. 53-55.

eFunds Introduces QualiFileSM, Deluxe Corporation, Milwaukee, WI, Sep. 1999.

Elliehausen et al., The Impact of Credit Counseling on Subsequent Borrower Behavior, The Journal of Consumer Affairs, Summer 2007, vol. 41, No. 1, pp. 1-28.

"Equifax and FICO Serve Consumers", Mar. 2001, p. 1.

Experian, "Custom Strategist and Qualifil from Funds", 2000, pp. 2.

Fair Isaac Corporation, myFICO: Calculators: Credit Assessment, http://www.myfico.com/CreditEducation/Calculators/CreditAssessment.aspx printed Jun. 8, 2005 in 2 pages.

(56) References Cited

OTHER PUBLICATIONS

Fair Isaac Corporation, myFICO: Help: FICO Score Simulator, http://www.myfico.com/Help/Simulator.aspx?fire=5 printed Jun. 8, 2005 in 2 pages.
Fair Isaac Corporation, myFICO: Products: Suze Orman's FICO http://www.myfico.com/Products/FICOKit/Description.aspx printed Kit Platinum, Jun. 8, 2005 in 4 pages.
Fair Isaac Corporation, myFICO: Products: Suze Orman's FICO® Kit Platinum: FICO Score Check, http://www.myfico.com/Products/FICOKit/Sample03.htm printed Jun. 7, 2005 in 1 page.
Fair Isaac Corporation, myFICO: Sample: FICO Score Simulator: "Max Out" Your Credit Cards, http://www.myfico.com/Content/Samples/Sample_ScoreSimulatorResults.asp?Simulation=4 &ReportID printed Jun. 8, 2005 in 2 pages.
Fair Isaac Corporation, myFICO: Sample: FICO Score Simulator: Miss Payments, http://www.myfico.com/Content/Samples/Sample_ScoreSimulatorResults.asp?miss_payment=radiobutton&Simulation= printed Jun. 8, 2005 in 2 pages.
Fair Isaac Corporation, myFICO: Sample: FICO Score Simulator: Pay Down Delinquent Balances First, http://www.myfico.com/Content/Samples/Sample_ScoreSimulatorResults.asp?textfieldCC=750 printed Jun. 8, 2005 in 2 pages.
Fair Isaac Corporation, myFICO: Sample: FICO Score Simulator: Suggested Best Action, http://www.myfico.com/Content/Samples/Sample_ScoreSimulatorResults.asp?Simulation=111 &ReportID=1&Pr printed Jun. 8, 2005 in 2 pages.
Hunt, Robert M., "Whither Consumer Credit Counseling?" Business Review, Dec. 31, 2005, pp. 9-20.
"Judging Credit: Consumers Need Better Finance Tools", News Journal, Daytona Beach, FL, Dec. 28, 2002.
Lee, W.A., "Experian Eyes Payments, Mulls Deals" American Banker: The Financial Services Daily, 2pgs., New York, NY, May 30, 2003.
Lee, W.A.; "Fair Isaac Taps Institutions for Credit Score Distribution", American Banker: The Financial Services Daily, New York, NY, Apr. 9, 2002, vol. 167, Issue 67, p. 1.
Lee, W.A., "Money, Quicken, and the Value of Alliances", American Banker: The Financial Services Daily, New York, NY, Jul. 28, 2003, pp. 2.
Powerforms: Declarative Client-Side for Field Validation, ISSN 1386-145x, Dec. 2000.
"Qualifying for Debt Settlement", http://www.certifieddebt.com/debt/settlement-qualifications.shtml printed Jan. 9, 2013 in 2 pages.
"Resolve Debt for Less: With Help from Freedom Financial" http://www,debtsettlementusa.com/ printed Jan. 9, 2013 in 6 pages.
"Settling Your Debts—Part 1 in Our Debt Settlement Series", http://www.creditinfocenter.com/debt/settle_debts.shtml printed Jan. 9, 2013 in 6 pages.
Singletary, Michelle "Ratings for the Credit Raters", The Washington Post, The Color of Money column, Mar. 24, 2002 in p. 1.
Singletary, Michelle, "Score One for Open Credit Ratings", The Washington Post, Washington DC, Jun. 18, 2000, pp. 3.
Stanton, T.H., "Credit Scoring and Loan Scoring as Tools for Improved Management of Federal Credit Programs", Financier, Philadelphia, Summer 1999, vol. 6, pp. 36.
Stein, Benchmarking Default Prediction Models: Pitfalls and Remedies in Model Validation, Moody's KMV, Revised Jun. 13, 2002, Technical Report #020305; New York.
Watts, Craig, "Consumers Now Can Know What Loan Rate Offers to Expect Based on Their FICO Credit Score at MyFICO.com", Mar. 6, 2002, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health", May 21, 2002, http://www.myfico.com/PressRoom/PressReleases/2002_05_21.aspx.
RapUP®, http://www.magnum.net/pdfs/RapUpBrochure.pdf printed Mar. 4, 2008 in 3 pages.
Yücesan et al., "Distributed web-based simulation experiments for optimization", Simulation Practice and Theory 9 (2001), pp. 73-90.
Zimmerman et al., "A web-based platform for experimental investigation of electric power auctions", Decision Support Systems 24 (1999), pp. 193-205.
Zoot—Instant Rules GUI, www.zootweb.com/instant_rules_GUI.html printed Mar. 3, 2008 in 1 page.
Zoot—Rules Management GUI, www.zootweb.com/business_rules_GUI.html printed Mar. 3, 2008 in 1 page.

\* cited by examiner

CREDIT DATA ANALYSIS

CROSS-REFERENCE TO RELATED APPLICATIONS

This application claims priority from provisional U.S. Pat. App. No. 61/732,244, filed on Nov. 30, 2012, which is hereby incorporated by reference in its entirety.

This application is related to, but does not claim priority from, U.S. patent application Ser. No. 10/452,155, filed May 30, 2003, now U.S. Pat. No. 7,610,229; U.S. patent application Ser. No. 12/606,060, filed Oct. 26, 2009, now U.S. Pat. No. 8,015,107; U.S. patent application Ser. No. 11/150,480, filed Jun. 10, 2005, now U.S. Pat. No. 7,593,891; U.S. patent application Ser. No. 12/563,779, filed Sep. 21, 2009, now U.S. Pat. No. 7,925,582; U.S. patent application Ser. No. 13/326,803, filed Dec. 15, 2011, and U.S. Prov. Pat. App. No. 60/384,650, filed May 30, 2002. The disclosures of the above-listed applications are all hereby incorporated by reference, for all purposes, as if set forth herein in their entireties.

BACKGROUND

This disclosure relates to the field of consumer credit information and particularly to the presentation of credit score and credit report information.

A credit score is an important indicator of a consumer's financial health. Consequently, having a high credit score is important to consumers for many reasons. A high credit score may qualify a consumer for various financial programs and/or allow a consumer to receive favorable rates is such programs, such as loan applications, rental applications, real estate mortgages, and so on. A credit report may allow a user to view the underlying data affecting their credit score. Thus, many consumers have a substantial interest in finding ways to improve their credit scores.

There is much information available to consumers as to how to improve credit scores. For example, sources provide advice to consumers to pay off loans, to establish certain numbers of credit accounts, to establish new loans, to raise or lower credit card limits, and so on. However, this advice is generic to all consumers and does not provide information specific to a particular consumer's situation. The question for many consumers then is "How is my particular credit data affecting my credit score"

To determine effective actions to take, it is often necessary to analyze a consumer's underlying credit information. However, paper credit reports are often confusing to consumers, and do not explain the effects of particular pieces of data contained within the credit report. Furthermore, consumers often do not know how their credit activities affect their credit score or how their credit score is calculated. This translates into consumers struggling to use and analyze their credit information in meaningful ways, or develop effective strategies to raise their credit score.

SUMMARY

Thus, it would be advantageous for consumers to be able to quickly view and understand how credit information and/or credit data affects their credit score. In particular, it would be advantageous for consumers to be able to visualize their particular credit data and understand how it is affecting their current credit score. It would also be advantageous for consumers to visualize the impact of specific credit data upon their credit score, either individually, or by category.

Consumers are interacting more every day with mobile devices, such as smart phones, tablets, and the like. However, information that consumers traditionally view in the form of printed materials don't optimize interaction capabilities of such mobile devices. Discussed herein are systems and methods for generating user interfaces that display credit information of consumers in manners that are specifically tailored for optimal use on mobile devices, such as user interfaces that optimize the user's ability to interface with credit data and to explore such credit data.

In an embodiment, a mobile application may display and receive input from various user interfaces, including a flippable user interface that displays consumer specific credit information values and high scorers values in a variety of credit categories. High scorers values indicate representative credit information for archetypal individuals who are considered low risk by lenders and/or have excellent credit scores. The flippable user interface allows a user to touch a flippable user interface and cause it to display, on a reverse side, information corresponding to the credit category that explains how that credit category affects their credit score. The mobile application thus enables a user to compare their own credit-related scores in various credit categories to the scores of high scorers to determine areas in which their scores are low and may be improved and/or areas in which their scores are high.

In an embodiment, a computer-implemented method of electronic credit data analysis in an electronic environment is disclosed. The method comprises: as implemented by one or more computer systems comprising computer hardware and memory, the one or more computer systems configured with specific executable instructions, receiving a request from a requestor for an electronic consumer credit analysis; accessing, from an electronic data store over a network, consumer credit data associated with a plurality of consumers, wherein the requestor is one of the plurality of consumers; designating a plurality of high scorers from the plurality of consumers, the one or more high scorers each having associated credit scores that exceed a predetermined threshold; calculating, with a processor, for each of one or more credit categories, a high scorer score based at least in part on consumer credit data associated with the plurality of high scorers; and transmitting, over the network, to the requestor, the electronic consumer credit analysis including the one or more credit categories, the one or more high scorer scores for the respective credit categories, and consumer credit data associated with the requestor for the respective credit categories.

According to an aspect, calculating a high scorer score for a particular category comprises averaging the consumer credit data of the plurality of high scorers within the particular category.

According to another aspect, the one or more credit categories includes at least one of a number of maxed-out credit cards, a number of public records, a number of credit inquiries, an average credit card limit, an average age of accounts, a mortgage standing, a number of missed payments, a number of open credit cards, number of installment loans, a credit-to-debt ratio, an oldest account age, and a credit file update time.

According to yet another aspect, the computer-implemented method further comprises: as further implemented by the one or more computer systems, determining a relevant demographic, wherein said designating one or more high scorers includes designating only high scorers associated with the relevant demographic.

According to another aspect, the relevant demographic includes at least one of an age associated with the requestor, a gender associated with the requestor, an ethnicity associated with the requestor, an employment status associated with the requestor, a geographic location associated with the requestor, a net worth associated with the requestor, and an income level associated with the requestor.

According to yet another aspect, the relevant demographic comprises a geographic location associated with the requestor, and wherein the geographic location associated with the requestor includes at least one of a neighborhood in which the requestor lives, a city in which the requestor lives, a county in which the requestor lives, a state in which the requestor lives, and a country in which the requestor lives.

According to another aspect, the computer-implemented method further comprises: as further implemented by the one or more computer systems, causing the electronic consumer credit analysis to be displayed in a user interface on a mobile computing device associated with the requestor.

According to yet another aspect, the computer-implemented method further comprises: determining the one or more credit categories based at least in part on the accessed consumer credit data.

According to another aspect, the high scorer score is periodically recalculated and retransmitted to the requestor.

In another embodiment, a computer system is disclosed which comprises: one or more hardware processors in communication with a computer readable medium storing software modules including instructions that are executable by the one or more hardware processors, the software modules including at least: a user interface module configured to receive, from a consumer, a request for a credit score analysis; a data collection module configured to retrieve, from an electronic credit data store, credit information associated with the consumer and a plurality of other consumers; and an analysis module configured to determine a set of high scorers from the plurality of other consumers, and determine, for each of a plurality of score factors, a consumer score and a high scorers score, wherein the user interface module is further configured to provide, to the consumer, an analysis comprising, for each of the plurality of score factors, the consumer score and the high scorers score.

According to an aspect, the user interface module is further configured to provide, to the consumer, for each of the plurality of score factors, an indication of whether the score factor positively or negatively impacts a credit score of the consumer.

According to another aspect, determining a high scorer score comprises averaging relevant credit information associated with the set of high scorers.

According to yet another aspect, the plurality of score factors includes at least one of a number of maxed-out credit cards, a number of public records, a number of credit inquiries, an average credit card limit, an average age of accounts, a mortgage standing, a number of missed payments, a number of open credit cards, number of installment loans, a credit-to-debt ratio, an oldest account age, and a credit file update time.

According to another aspect, the analysis module is further configured to determine a particular demographic, wherein the set of high scorers is associated with the particular demographic.

According to yet another aspect, the analysis is displayed in a user interface on a mobile computing device associated with the consumer.

According to another aspect, the set of high scorers is periodically re-determined.

In yet another embodiment, a non-transitory computer storage that comprises executable instructions configured to cause one or more computer processors to perform operations comprises: receiving first consumer credit information associated with a consumer, wherein the received consumer credit information comprises summary data associated with categories of credit information that impact a credit score of the consumer; receiving second credit information relating to a plurality of consumers with credit scores above a predetermined threshold, wherein the received second credit information comprises summary data of the plurality of consumers associated with the categories of credit information; and generating, for display on a touch sensitive computing device, a user interface comprising a plurality of panes associated with respective categories of credit information, wherein each pane is configured to provide a comparison between the first consumer credit information associated with the respective category and the second credit information associated with the respective category.

According to an aspect, each pane is further configured to provide an indication of whether credit information of the consumer in a respective category positively or negatively impacts the credit score of the consumer.

According to another aspect, each of the plurality of consumers is associated with a particular demographic population.

According to yet another aspect, the particular demographic population includes at least one of an age, a gender, an ethnicity, an employment status, a geographic location, a net worth, and an income level.

According to another aspect, the particular demographic population is associated with the consumer.

BRIEF DESCRIPTION OF THE DRAWINGS

The following aspects and many of the attendant advantages of the disclosure will become more readily appreciated as the same become better understood by reference to the following detailed description, when taken in conjunction with the accompanying drawings, wherein.

DETAILED DESCRIPTION

Figure 5A:
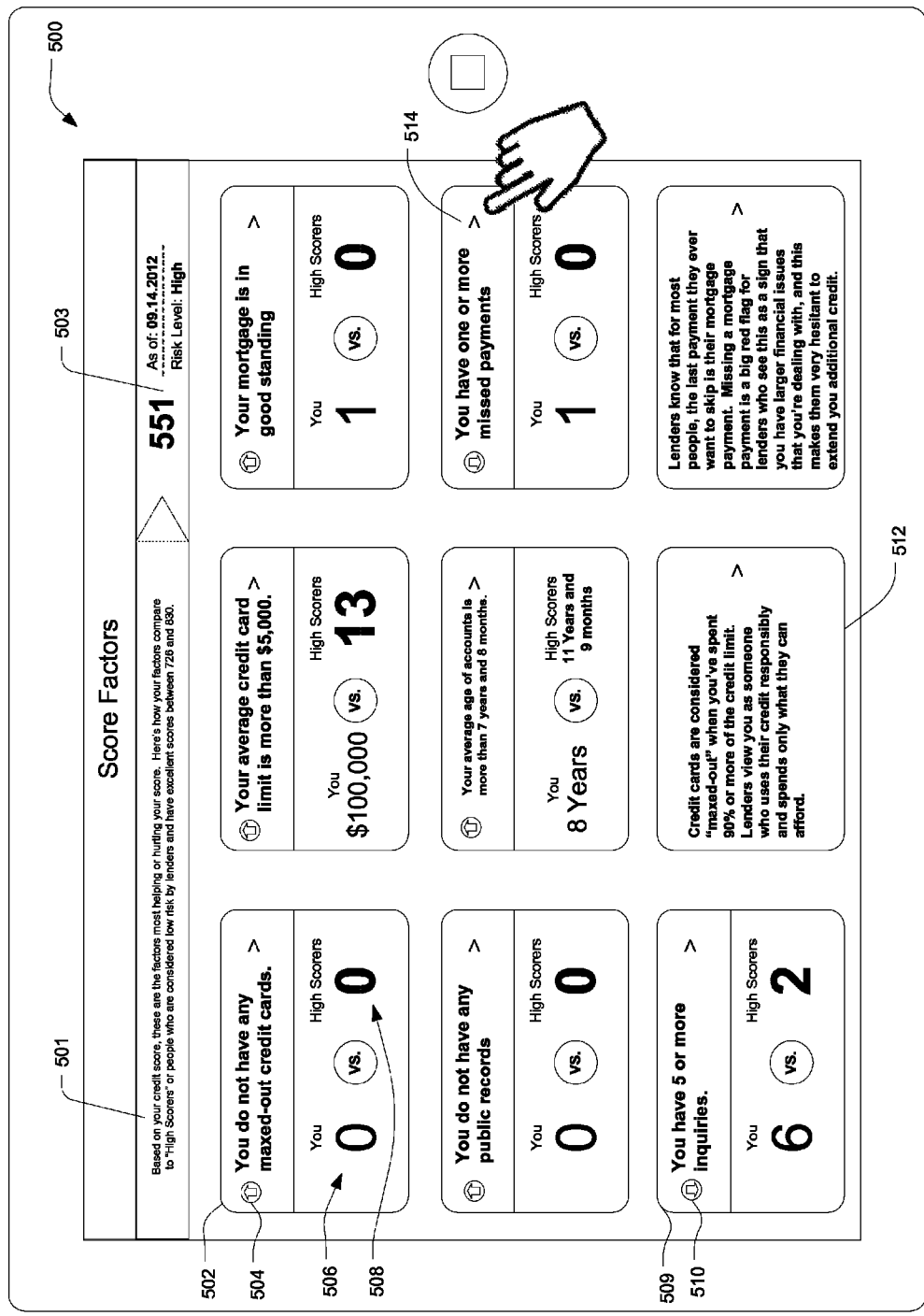
FIGS. 5A and 5B are illustrative user interfaces of the credit data analysis system, according to embodiments of the present disclosure.
Figure 5B:
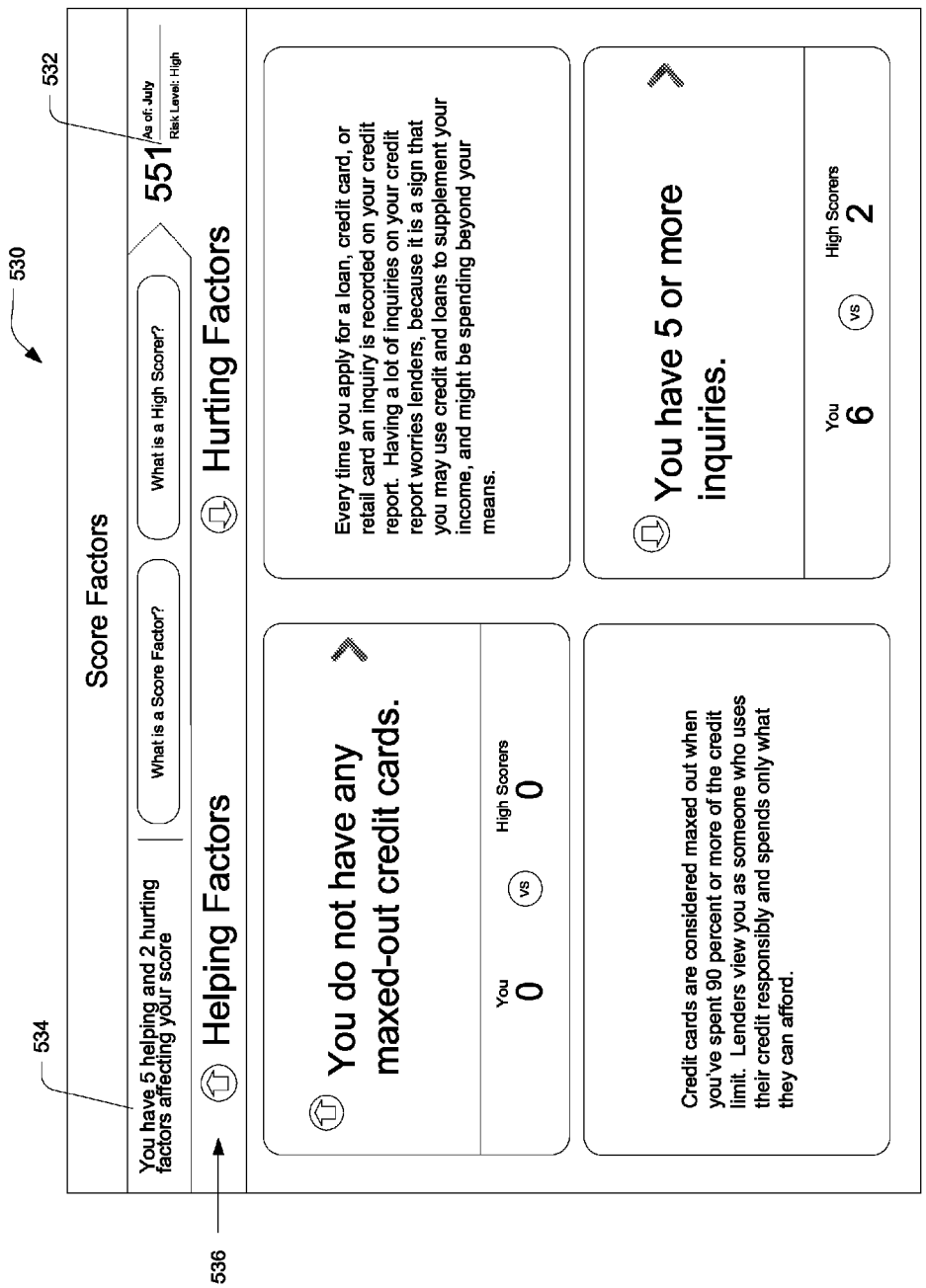

A computing device such as a mobile smart phone and/or a tablet may display a score factors user interface comprising one or more credit score factor user interface panes that provide context for a consumer's and/or user's credit report, as illustrated in the examples of FIGS. 5A and 5B. The score factor user interface pane may comprise a description of the type of data to be displayed and/or compared that is associated with a summary of credit score inputs. The analysis of this summary of credit score inputs (e.g. sometimes known as a summary attribute) may be considered a score factor. Score factors are a type of summary data that may influence a consumer's score positively or negatively. For example, the user interface element 509 (in FIG. 5A) has the description of a score factor called "You have 5 or more credit inquiries" which is based on a summary attribute that counts the number of credit inquiries for a particular consumer, and also determines an average number of credit inquiries for a group of high scorers. If the summary data indicates that there are 5 of more credit inquiries for a particular consumer, then the condition for that score factor is met, and the mobile device may display the score factor description.

In some embodiments, a score factor user interface pane may also have an indicator associated with whether the particular score factor affects the score positively or negatively. For example, score factor user interface element 510 contains an arrow pointing at the bottom of the screen (or may have a red color) to indicate that a higher number affects the consumer's credit score negatively. Whereas score user interface element 504 contains an arrow pointing at the top of the screen (or may have a green color) to indicate that a higher number affects the score positively. The categories for the score factors, and whether a higher number is more positive or negative (e.g., a positive score factor or a negative score factor) may be transmitted from a credit bureau data store, a credit bureau, and/or a back end system.

Also displayed within a score factor user interface pane are the values of the consumer's related score factor data and the average data points in the same score factor for a group of high scorers. For example, score factor user interface pane 510 for the score factor "You have 5 or more inquiries" displays the value 6 for the consumer, and 2 for the high scorers side by side, so that the user can easily know their own value for that category, and optionally compare that value between the consumer values and scores of high scorers (that can be used as positive guidelines to improve the consumer's score). In general, a high scorer is a person who is considered low risk by, for example, banks and/or lenders, and/or who has an excellent credit score, for example, an overall credit score between 726 and 830. In an embodiment, the term "high scorers" refers to a group of persons who each have excellent credit scores.

Advantageously, the score factor user interface enables a user to compare their own scores in various credit categories to scores of high scorers in the various credit categories. In an embodiment, a high scorers score in one of the various categories may be an average of all the high scorers' individual scores in the category. Categories (also referred to herein as credit categories or score factors) in which a user may compare their own score to a high scorers score may include, for example, a number of maxed-out credit cards, a number of public records, a number of credit inquiries, an average credit card limit, an average age of accounts, a mortgage standing, and/or a number of missed payments, among others.

In an embodiment, the credit data analysis system allows the user to compare the user's scores in various categories with scores of high scorers derived from high scorers of a particular demographic and/or geographic region. For example, a user may be primarily interested in their scores in their own state. The credit data analysis system allows such a user to compare their scores in various credit categories to high scorers located only in their state. Thus, the user may advantageously determine credit categories in which they excel, and in which they lack, as compared to a relevant population of high scorers.

In an embodiment, the scores of high scorers and/or the user's scores in the various credit categories may periodically be updated. Such updating may be initiated automatically by the user, and/or it may occur automatically.

A score factor user interface element may be selected via the touch screen interface to reveal more information about the credit score factor. When touched, in some embodiments, the computing device may display the "virtual" reverse side of the score factor, such as user interface element (512). The virtual reverse side may comprise explanatory text about how a consumer's score in that particular score factor may affect his overall credit score. Virtual reverse sides may optionally be color coded depending on whether a score factor is positive or negative. If touched again, the user interface element may return to the original side to show the score factor description, consumer values, and high scorers values.

When transitioning to or from the reverse side of the score factor user interface pane, the user interface element may appear to flip or rotate either horizontally or vertically on its center vertical or horizontal axis respectively to the reverse side. In some embodiments, such a rotation or flip may occur more than once. In some embodiments, a rotation or flip may occur several times in succession, where the rotation speed slows down over time until the card comes to rest on the reverse side.

The score factor panes displayed on the user device may be selected by the user, the computing device, the credit bureau, and/or other backend system such as a credit data analysis server based on which score factors apply to a particular user's credit information. For example, the user interface pane 510 has the description "You have 5 or more inquiries". This particular score factor may not be selected for display if the number of credit inquiries for the consumer was less than 5. Additionally, the order that the user interface panes are displayed may indicate the relative impact or importance of each score factor in determining a consumer's credit score.

In some embodiments, when a score factor user interface pane is touched, the score factor instead displays to a user the specific credit information inputs that made up the score factor statistic. For example, if the user touches the user interface 502, the user device may display information about the associated credit card accounts.

As used herein, the terms "user," "individual," and/or "consumer" may be used interchangeably, and should be interpreted to include users, applicants, customers, single individuals as well as groups of individuals, such as, for example, families, married couples or domestic partners, and business entities. More particularly, the terms "user," "individual," and/or "consumer" may refer to: an individual subject of the financial services portal system (for example, an individual person whose financial status and experience are being determined). In general, for the sake of clarity, the present disclosure usually uses the terms "consumer" and "user" to refer to an individual subject of the credit data analysis system.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

System Overview

Figure 1:
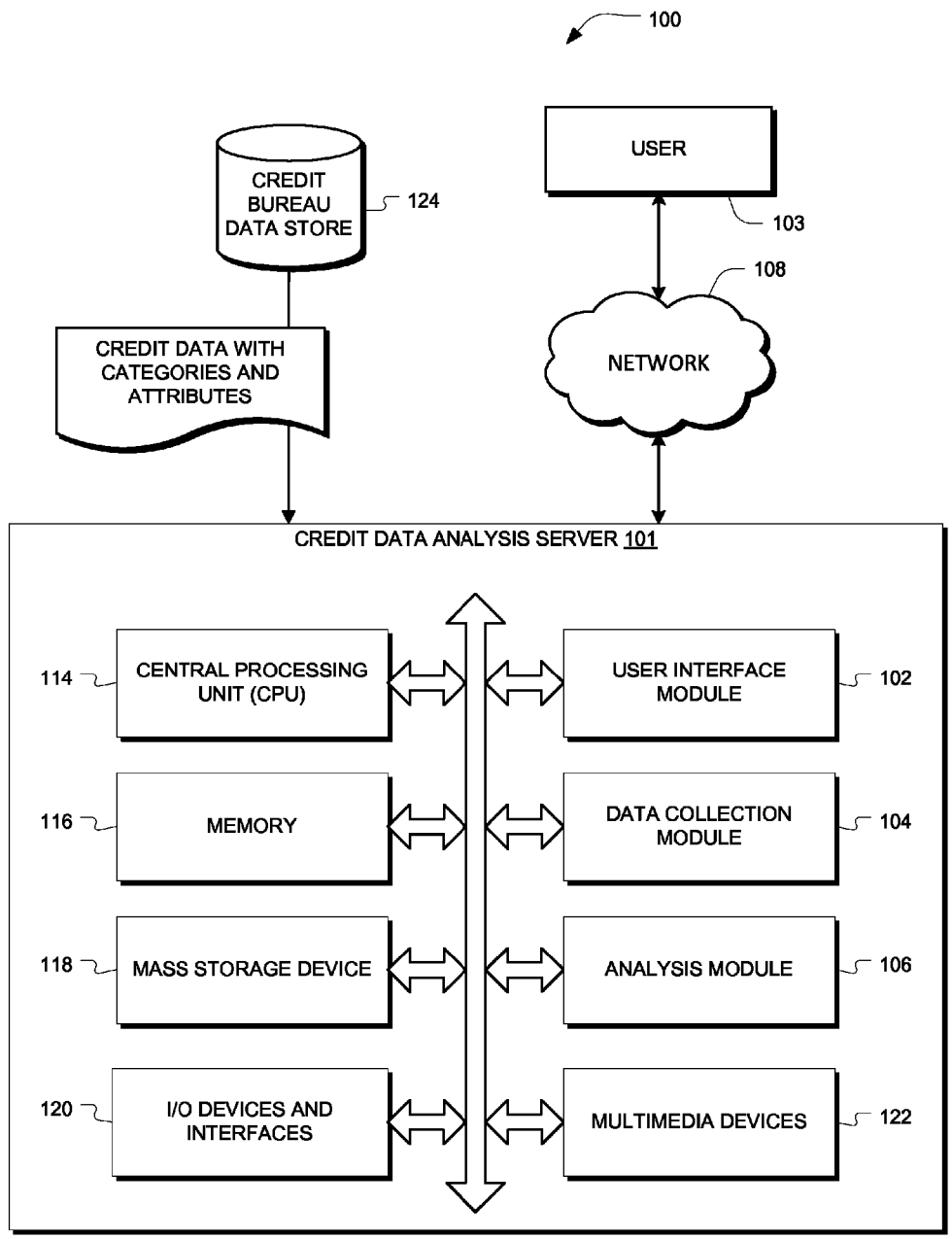
FIG. 1 is a block diagram of an illustrative network environment in which a credit data analysis system may operate, according to an embodiment of the present disclosure.

FIG. 1 is a block diagram of an illustrative network environment 100 in which a credit data analysis system may operate, according to an embodiment of the present disclosure. The credit data analysis system may include a credit data analysis server 101, a network 108, a user 103, and a credit bureau data store 124. The constituents of the network environment 100 may be in communication with each other either locally, or over the network 108.

Additionally, the credit data analysis server 101 may include a user interface module 102, a data collection module 104, an analysis module 106, a central processing unit (CPU) 114, a memory 116, a mass storage device 118, I/O devices and interfaces 120, and multimedia devices 122, all of which may communicate with one another by way of a communication bus. The credit data analysis server 101 may include an arrangement of computer hardware and software elements that may be used to implement the credit data analysis system. FIG. 1 depicts a general architecture of the credit data analysis server 101, but the credit data analysis server 101 may include more (or fewer) components than those shown in FIG. 1.

The user 103 may communicate with the network 108 through any type of computing device capable of sending and receiving data to and from the credit data analysis server 101. In an embodiment, the computing device operated by the user 103, or with which the user 103 interacts, may be a mobile computing device, may include a web browser configured to communicate with the user interface module 102, and/or may be capable of running mobile applications that may communicate with the credit data analysis server 101. In an embodiment, more than one consumer may interact with the credit data analysis server 101. For example, many users may simultaneously (or substantially simultaneously) interacts with the credit data analysis server 101, making requests and receiving responses.

The network 108 may be any wired network, wireless network, or combination thereof. In addition, the network 108 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The credit data analysis server 101 is a computing device that may perform a variety of tasks to implement the credit data analysis system, and may include hardware such as processors, memory, storage media, network interfaces, and so on. The operating of the credit data analysis server 101 may be implemented through, for example, the user interface module 102, the data collection module 104, and the analysis module 106. The modules of the credit data analysis server 101 may be stored in software or in read only memory or otherwise be accessible to the computing hardware of the financial portal.

In an embodiment, the user interface module 102 may enable credit data analysis server 101 to communicate via an HTTP or other network communications protocol. In an embodiment, the user interface module 102 is configured to serve one or more webpages to the user 103 that connects to the credit data analysis server 101. User interface module 102 may also provide features such as data gathering from users, authentication, email communication, telephone and/or voice interfaces, and/or other services as may be used by credit data analysis server 101. The user interface module 102 may further generate user interfaces for display to the user 103. Exemplary user interfaces generated by the user interface module 102 are described in reference to FIGS. 5A and 5B.

Figure 2:
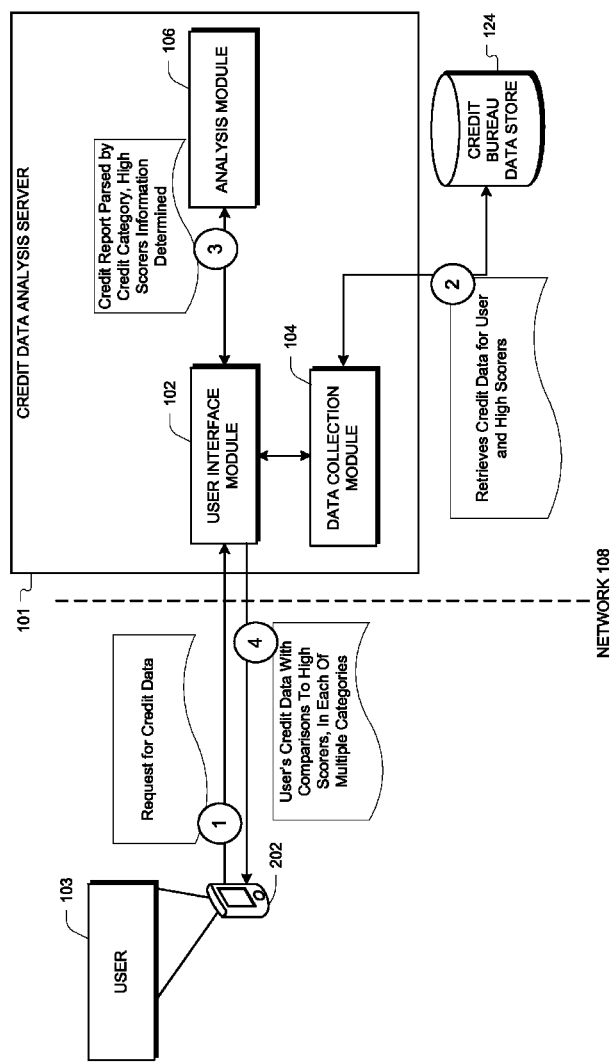
FIG. 2 is a data flow diagram depicting an illustrative operation of the credit data analysis system, according to an embodiment of the present disclosure.

User interface module 102 may include computer executable portions that are executed by the credit data analysis server 101 and/or by a user computing device (such as the computing device 202 of FIG. 2). Thus, discussion herein of operations performed by the user interface module 102 may be performed entirely by the credit data analysis server 101, entirely by the computing device 202, or some portions may be performed by the credit data analysis server 101 while other portions are performed by the computing device 202. Furthermore, other computing systems may also perform all or some of the processes discussed with reference to the user interface module 102.

In one embodiment, the user interface module 102 may access data from data collection module 104 or credit bureau data store 124, and use that data to construct user interfaces that assist the user in understanding his or her credit score and how the underlying data is used to construct a credit score. Such information may be presented to the end user and is designed to be easily manipulated and/or understood by the user. In an embodiment, the user interfaces transmitted by user interface module 102 are interactive. Various embodiments of the user interfaces that may be provided by user interface module 102, including score factor user interface panes that are shown and described throughout this specification.

User interface module 102 may be configured to construct user interfaces of various types. In an embodiment, user interface module 102 constructs web pages to be displayed in a web browser or computer/mobile application. The web pages may, in an embodiment, be specific to a type of device, such as a mobile device or a desktop web browser, to maximize usability for the particular device. In an embodiment, user interface module 102 may also interact with a client-side application, such as a mobile phone application (an "app") or a standalone desktop application, and provide data to the application as necessary to display underlying credit score information.

In an embodiment, the credit data analysis server 101 may further include data collection module 104. The data collection module 104 may perform various tasks of gathering and/or collecting data for the credit data analysis system. The data collection module 104 may provide a consistent interface for external services and databases, such as financial services, credit bureau services, and the like, to interact with the credit data analysis server 101. For example, the credit data analysis server 101 may retrieve credit data, including categories and attributes associated with the credit data, from the credit bureau data store 124 via the data collection module 104. In an embodiment, the data collection module 104 may include an application programming interface (API) that may enable the credit data analysis server 101 to receive data from external services and databases, and may further enable external services and databases to retrieve data about a user from the credit data analysis server 101. It may also enable external services and databases (such as the credit bureau data store 124) to provide information to the credit data analysis server 101, such as updated credit data (including related categories and attributes) related to the user 103.

The credit bureau data store 124 may include information and data related to the credit of many individuals, including the user. In an embodiment, the credit bureau data store 124 may comprise one or more credit bureaus and their databases, which usually receive information from raw data sources, such as banks and creditors. In an embodiment, the credit bureau data store 124 is in communication with the credit data analysis server 101 over the network 108. In an embodiment, the credit bureau data store 124 is in communication with the credit data analysis server 101 over a dedicated and/or secure data channel. In an embodiment, the credit bureau data store 124 is operated by a credit bureau.

In an embodiment, credit data is gathered on demand as required by the credit data analysis system. In another embodiment, credit data is gathered on a periodic basis independent of requests for information from the credit data analysis server 101. In another embodiment, credit data is stored on the credit data analysis system (for example, in a client computing device and/or data collection module 104), in which case, retrieval of credit data from a credit bureau may not be necessary. The credit data may include a complete credit report about a consumer, summary data such as credit attributes (also referred to as credit variables) that are calculated using various modules, such as Experian's STAGG (standard aggregation variables), credit data inputs to calculate a complete or partial credit score, credit card data, public record data, credit inquiry data, bank account data, loan data, mortgage data, line of credit data, payment data, and the like. Each credit data input may be associated with a particular score factor. A score factor is a value that is known to impact credit score. Examples of score factors are described elsewhere herein. In some embodiments, the data collection module 104 may calculate summary attributes (e.g. STAGG attributes) or perform other modifications on the credit report or other credit data gathered, to determine a score factor. In some embodiments, a score factor value may be a summary or STAGG attribute value.

In an embodiment, the credit bureau data store 124 may be embodied in hard disk drives, solid state memories, and/or any other type of non-transitory, computer-readable storage medium remotely or locally accessible to the credit data analysis server 101. The credit bureau data store 124 may also be distributed or partitioned across multiple storage devices as is known in the art without departing from the spirit and scope of the present disclosure.

In an embodiment, the data collection module 104 may also gather explanatory text information about how a credit score is calculated. This may include description text, algorithms, formulas, executable code, statistical variables, and the like. This information may be used to understand the significance of a score factor in calculating a credit score. This may include an indication of whether a higher or lower value of a particular score factor positively or negatively impacts a credit score. In an embodiment, the explanatory text and positive or negative indications may be retrieved from the credit bureau data store 124 on an on-demand basis as needed by the credit score factor computing system. In another embodiment, the models and/or algorithms are retrieved on a periodic basis. In another embodiment, the credit score factor computing system internally stores the models and/or algorithms (for example, stored on a client computing device).

In an embodiment, the analysis module 106 may enable the credit data analysis server 101 to determine credit scores, credit categories, score factors, demographic groups, geographic locations and/or regions, high scorers groups, and/or scores of high scorers, among others. The analysis module 106 may use data from the data collection module 104. Furthermore, the user interface module 102 may communicate with analysis module 106 in order retrieve the various values, scores, and inputs previously mentioned.

Multimedia devices 122 may include, for example, an optional display and/or an optional input device. The optional display and optional input device may be used in embodiments in which users interact directly with the credit data analysis server 101. The I/O devices and interfaces 120 may include a network interface (among other devices) that may provide the credit data analysis server 101 with connectivity to one or more networks or computing systems. For example, the network interface may communicate over the network 108 with the credit bureau data store 124, and/or the user 103. The CPU 114 may thus receive information and instructions from other computing systems or services through a network. The CPU 114 may also communicate with memory 116, and further provide output information for the multimedia devices 122. The I/O devices and interfaces 120 may accept input from the optional input device, such as a keyboard, mouse, digital pen, touch screen, or gestures recorded via motion capture. The I/O devices and interfaces 120 may also output audio data to speakers or headphones (not shown).

The memory 116 contains computer program instructions that the CPU 114 executes in order to implement one or more embodiments of the credit data analysis system. The memory 116 generally includes RAM, ROM and/or other persistent or non-transitory computer-readable storage media. The memory 116 may store an operating system software (such as Windows XP, Windows Vista, Windows 7, Windows 8, Windows Server, Unix, Linux, SunOS, Solaris, Macintosh OS X, or other compatible and/or proprietary operating systems) that provides computer program instructions for use by the CPU 114 in the general administration and operation of the credit data analysis server 101. The memory 116 may further include other information for implementing aspects of the credit data analysis system.

For example, in one embodiment, the user interface module 102, the data collection module 104, and/or the analysis module 106 may be implemented in the memory 116. The user interface module 102, the data collection module 104, and the analysis module 106, as implemented in the memory 116, may facilitate the same tasks as those described.

In an embodiment, the user interface module 102, the data collection module 104, and/or the analysis module 106 may be stored in the mass storage device 118 as executable software codes that are executed by the CPU 114. The modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the credit data analysis server 101, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the functionality of the credit data analysis server 101 may be implemented partially or entirely by a computing device and/or mobile computing device operated by, for example, the user 103. Accordingly, the user computing device may include the user interface module 102, the data collection module 104, the analysis module 106, and/or other components that operate similarly to the components illustrated as part of the credit data analysis server 101, including a CPU 114, network interface, mass storage device 118, I/O devices and interfaces 120, memory 116, and so forth.

Many of the devices described herein are optional in various embodiments, and embodiments of the credit data analysis system may or may not combine devices. Moreover, any computing devices operated by user 103 and/or the credit data analysis server 101, may each be embodied in a plurality of devices, each executing an instance of the respective devices. However, devices need not be distinct or discrete. Devices may also be reorganized in the credit data analysis system. For example, the credit data analysis server 101 may be represented in a single physical server or, alternatively, may be split into multiple physical servers. The entirety of the functions of the credit data analysis server 101 may be represented in a single user computing device as well. Additionally, it should be noted that in some embodiments, the functionality of the credit data analysis server 101 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The computing device and/or mobile computing device operated by the user 103, and described above, may be any computing device capable of communicating over the network 108, such as a laptop or tablet computer, personal computer, personal digital assistant (PDA), hybrid PDA/mobile phone, mobile phone, in-vehicle computer device or navigation system, global positioning system (GPS) device, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like.

High Level Data Flow

FIG. 2 is a data flow diagram depicting an illustrative operation of the credit data analysis system, according to an embodiment of the present disclosure. The data flow of FIG. 2 illustrates an exemplary process for accessing credit data of a particular user, accessing credit data of high scorers, analyzing the accessed credit data to compare high scorers values and the users values in a number of credit categories (also referred to as score factors), rendering the analyzed credit data within user interfaces so that consumers may better understand the impact of their credit data, and displaying flippable score factor cards associated with their credit data. Depending on the embodiment, the process illustrated by interactions 1-4 of FIG. 1 may include fewer or additional interactions and/or the interactions may be performed in an order different than is illustrated.

The exemplary data flow of FIG. 2 includes the credit data analysis server 101, the credit bureau data store 124, the network 108 (depicted by the dotted line), the user 103, and a client computing device 202 which may be operated by the user 103. The credit data analysis server 101 further includes the user interface module 102, the data collection module 104, and the analysis module 106, as described in reference to FIG. 1 above.

The computing device 202 may be an end user computing device that comprises one or more processors able to execute programmatic instructions. Examples of such a computing device 202 are a desktop computer workstation, a smart phone such as the apple iPhone, a computer laptop, a tablet PC such as the iPad, a video game console, or any other device of a similar nature. In some embodiments, the computing device 202 may comprise a touch screen that allows a user to communicate input to the device using their finger(s) or a stylus on a display screen. The computing device 202 (or any of the computing systems described herein, such as credit data analysis server 101), as described in reference to FIG. 1, may comprise storage systems such as a hard drive or memory, or comprise any other non-transitory data storage medium. The storage systems may be configured to store executable instructions that may be executed by one or more processors to perform computerized operations on the client computing device, accept data input from a user (e.g. on the touch screen), and/or provide output to a user using the display. These executable instructions may be transmitted to another device for execution or processing by the device to implement the systems and methods described herein. In an embodiment, the computing device 202 may comprise software and/or hardware that implements the user interface module 102. The computing device 202 may be in communication with the credit data analysis server 101 and/or the credit bureau data store 124 via the network 108.

The computing device 202 may also comprise one or more client program applications, such as a mobile "app" (e.g. iPhone or Android app) that may be used by a consumer to understand their credit score, and initiate the sending and receiving of messages in the credit data analysis system. This app may be distributed (e.g. downloaded) over the network to the client computing device directly from a credit bureau, from the credit data analysis server 101, from data collection module 104, or from various third parties such as an apple iTunes repository. In some embodiments, the application may comprise a set of visual interfaces that may comprise templates to display a consumer's credit data information from a credit report or associated attributes in score factor categories. In some embodiments, as described above, user interfaces may be downloaded from another server or service, such as the credit data analysis server 101. This may comprise downloading web page or other HTTP/HTTPS data from a web server and rendering it through the "app". In some embodiments, no special "app" need be downloaded and the entire interface may be transmitted from a remote Internet server to computing device 202, such as transmission from a web server that is a part of the credit data analysis server 101 to an iPad, and rendered within the iPad's browser.

Beginning with interaction (1), the computing device 202 may transmit to credit data analysis server 101 a request for credit data (via the user interface module 102). The requested credit data may include items such as a score factors user interface including one or more score factor user interface panes with credit categories scores related to the user 103 and high scorers, that may be generated based on underlying credit data. Such underlying credit data may include a score factor, credit report, credit score, credit attributes, and/or explanatory information regarding how attributes are calculated based underlying credit data and/or how attributes impact the credit score. In some embodiments, attributes that summarize credit data (e.g. summary attributes or summary credit information) fitting a particular category may be considered a score factor. The request may also include a request for an indication of whether a particular score factor (e.g. credit attribute) positively or negatively affects credit score.

The request may also comprise a request for high scorers information. High scorers information may comprise average summary data, such as attributes matching a score factor, that are calculated by averaging data in that credit category from a group of high scorers. A high scorer may be considered a consumer that has a credit score above a certain threshold and/or has some other attributes that are envied by a typical consumer. High scorers data may be associated with a particular demographic group, such as a geographic area, and may summarize average credit data for high scorers within the demographic group.

In some embodiments, such a request may be accompanied with an authentication or authorization request. For example, in some embodiments, access to credit data may be restricted based on user identification. An authentication scheme may comprise submitting a user name and password to the credit data analysis server 101, or any other authentication mechanism known by those skilled in the art. The authentication request may have occurred prior to the request for data access and/or during the request. In some embodiments, although a user may authenticate, only certain users will be authorized to receive credit report data. For example, the credit data analysis server 101 may comprise memory storing a list of users or types of users that may gain access to their credit data, such as paying users. In some embodiments, no authentication is necessary and credit data may be freely accessed by all users. Such a request may also include a request for the algorithms or user interfaces that may be used by an "app" or browser to render and interact with the requested credit data.

In some embodiments, some functionality may be accessible by unauthenticated users, and other functionality only accessible to authenticated users. The authenticated and unauthenticated sections may have the same features, similar features, or different features. In an embodiment, the authenticated section offers additional features not available in the unauthenticated section. For example, credit data or credit-related information is used in the various systems and methods described herein. This information may be stored in member accounts or automatically retrieved based on member account data. In such an embodiment, the credit-related information may be automatically pre-populated, so that members need not enter that information, while unauthenticated users would enter their information manually.

In interaction (2) of FIG. 2, the credit data analysis server 101, via the data collection module 104, may retrieve the requested information, and/or calculate the requested information, from the credit bureau data store 124 (whether maintained by a credit bureau or another entity authorized to provide credit data). In some embodiments, the data collection module 104, upon receiving a request from the computing device 202, may retrieve or calculate a credit report, credit score, attributes, explanatory data, and/or high scorers data from its local storage and fulfill the access request without consulting a credit bureau.

For example, the data collection module 104 may have previously received a credit report and credit score from a credit bureau for that user and would have the report cached in its local storage. Alternatively, previously retrieved and/or calculated scores of high scorers and data may be stored locally. In some embodiments, the credit report and score may be periodically retrieved for users from a credit bureau in order to have it locally on file. Alternatively, or in combination, the data collection module 104 may retrieve in real time the credit report, credit score, high scorers data, and/or summary credit attributes from the credit bureau data store 124. Any credit information required in the various embodiments, such as explanatory information, information about how a credit score is calculated, summary data, credit reports, credit score, high scorers data, etc., may be retrieved periodically and on demand, or cached in this manner.

The data collection module 104 may also calculate any attributes required by the user interfaces implemented by the user interface module 102 (if any are required outside of default summary attributes). For example, summary credit attributes may be calculated by credit bureaus that summarize credit data. These summary credit attributes can be requested along with, or as an alternate to, a credit report or credit score. However, the data collection module 104 may also compile the summary attributes based on the credit report, or calculate custom attributes based on the credit report. For example, one summary attribute may comprise a calculation of the amount of available credit for a consumer. Such an attribute may be calculated based upon summing up all of the un-used credit available in a consumer's accounts. This final figure may then be associated with the credit report and stored in the data gathering module for later transfer to a client computing device 202. These calculations may be performed on demand or periodically. In an embodiment, attribute calculation and/or credit category calculations may be performed by the analysis module 106.

In addition to retrieving credit reports, scores, and/or attributes, the data collection module 104 may, in some embodiments, retrieve explanatory text about how the attributes involved may impact a credit score, and indications of whether a high or low value in an attribute may impact a credit score. These may be stored locally on disk within the data collection module 104, or retrieved from credit bureau data store 124 and/or other credit database. For example, explanatory text and/or indicators may be retrieved from the credit bureau data store 124 and/or known in advance by the data collection module 104. Based on the retrieved information, the data collection module 104 and/or the user interface module 102 may alter or generate a score factors user interface (and/or other user interface) to reflect this information. For example, as shown in FIG. 5A, one summary attribute may be how many maxed out credit cards a consumer has 502. Explanatory text, such as the text that appears in pane 512 may be used in a score factors user interface.

After retrieving and/or calculating the information, interaction (3) of FIG. 2 illustrates the retrieved and/or calculated data being provided to the analysis module 106 such that the retrieved and/or calculated data may be parsed, further calculations may be performed, and/or high scorers information may be determined. In an embodiment, a high scorer is a person who is considered low risk by, for example, banks and/or lenders, and/or who has an excellent credit score, for example, an overall credit score between 726 and 830. A high scorer may also be referred to as a score master and/or an expert. In an embodiment, the term "high scorers" may refer to a group of persons who each have excellent credit scores. Thus, in some embodiments, a group of high scorers is determined by the analysis module 106, and score factors and/or attributes in a number of credit categories for the high scorers are determined. In an embodiment, the high scorers group may be determined based on some demographic criteria, such as a geographic location. In some embodiments, the high scorers group that is used in comparison to a particular consumer may be determined by a particular consumer. For example, a particular consumer may want to be compared to a group of individuals in the consumer's ZIP Code that all have credit scores above 800, while another consumer may want to be compared to a group of individuals in the consumer's ZIP Code that all have credit scores between 600 and 700. The process of determining scores of high scorers is described further in reference to FIGS. 3 and 4 below. Additionally, analysis module 106 determines scores and/or attributes associated with the user 103 in a number of credit categories. The determined scores and other analyzed data is then transmitted back to the user interface module 102.

In an embodiment, the analysis module 106 may store the received credit information, and parse the credit report, credit score, attributes, explanatory text, indications, or high scorers data that may be required to render the user interface in various embodiments. This may include organizing in a data structure one or more received attributes and other received information into such as explanatory text and indications by association. For example, the credit data analysis system may match appropriate description text, explanatory text, attribute and/or category values (for the user and the high scorers), and indications together. The system may be pre-programmed to recognize certain attributes as information for score factor categories to be used, and prepare the data structures appropriately. In some embodiments, the received information will also indicate which attributes to use and which score factor user interfaces to show, based on a selection of score factors made by the credit data analysis server 101 or a credit bureau. Any additional attributes or summarization data may be calculated if needed based on the credit report or accompanying information for use in the user interfaces.

In interaction (4) of FIG. 2, a user interface including the user's credit data and high scorers credit data in each of multiple categories is transmitted to the computing device 202, via the network 108. This information may be transmitted using a text credit report format, an XML format, using web services APIs, or any other organized data structure or protocol for transferring the information between the credit data analysis server 101 and the computing device 202. Alternatively, this information may be transmitted to the computing device 202 as a part of a web page and accompanying web page user interfaces to be rendered with an app or a browser, such as software code configured to generate the various visual features of the credit summary user interface discussed herein. In this embodiment, the credit data analysis system may act as a web page or web site configured to provide static, scriptable, or executable code and data that may be used to implement the entire invention, even with a computing device 202 only capable of web browsing. In an embodiment, the user interface module 102 is located in the computing device 202, and thus only the credit data is transmitted to the computing device 202 where a user interface is provided.

In an embodiment, the computing device 202 displays a score factors user interface (also known as a flippable score factor pane user interface), where each score factor pane is based upon a selected summary or custom attribute, that may use associated explanatory text, positive or negative indicators, a short description, a display of the attribute's value, and high scorers information. By way of example, FIGS. 5A and 5B illustrate score factor user interfaces that may be used in some embodiments.

Optionally, in some embodiments, the summarized data/score factor information displayed in each score factor user interface pane may be linkable to a displayable portion of a credit report on the computing device 202. For example, by touching a specific piece of data within a score factor user interface pane or the score factors user interface, the user may be automatically directed to a portion of the user's credit report displaying detailed information related to the score factor. With reference to FIG. 5A, for example, if the text "You do not have any maxed-out credit cards" 502 was touched, the computing device 202 and/or credit data analysis system may direct the user to a portion of their credit report listing all credit card account information, including each individual credit limit for each account and/or other data related to the user's total credit limit. Advantageously, this allows a user to easily browse and visualize a high level overview of their credit data and drill down into their detailed credit report for further information. Alternatively, upon touching the text, the user may be directed to an indication of the source of the high scorers score, for example, the attributes associated with the members of the determined high scorers group.

Credit Reports and Credit Bureaus

The credit data analysis system may be separate from a credit bureau or credit bureau data store 124. One of the purposes of the credit data analysis system is to interface with the credit bureau or any database that has data that will eventually be used in a user interface by computing device 202. The credit data analysis system may request and extract the appropriate credit data for a specific consumer based on a user using the computing device 202. This allows for a single point of contact for computing device 202 interaction. The credit data analysis system can then be configured to request from and receive data from credit bureaus or other credit databases.

Alternatively, the credit data analysis system may be executed by a credit bureau itself. In this case, the credit report system and the credit bureau functionality may be combined, with no need to transfer data over a wide area network between them. In some embodiments, the client computing device 202 may be configured to interact directly with a credit bureau over a network, to access a credit report and summary attributes. In this case, any custom attribute creation or processing needed must be performed by the computing device 202.

Example Method of Providing High Scorers Values to a User

Figure 3:
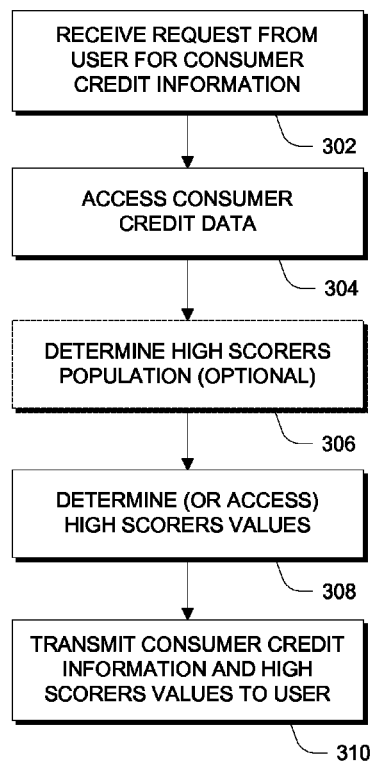
FIG. 3 is a flow diagram depicting an illustrative operation of the credit data analysis system in which high scorer values are presented to a user, according to an embodiment of the present disclosure.

FIG. 3 is a flow diagram depicting an illustrative operation of the credit data analysis system in which high scorers values are presented to a user, according to an embodiment of the present disclosure. In various embodiments, fewer blocks or additional blocks may be included in the process, or various blocks may be performed in an order different from that shown in FIG. 3. In particular, the blocks in FIG. 3 may be performed by computing device 202 and/or credit data analysis server 101 (or any combination thereof), depending on which computing device/software service has access to the required credit data.

In general, credit bureaus make their data available to consumers and businesses, usually for (but not limited to) the purpose of checking a consumer's credit history and credit score. A credit bureau's credit report may include, among other things, data concerning payment history (such as current accounts and late payments), credit usage and availability, the age of financial accounts, the types of financial accounts, and inquiries into credit reports or credit scores. This data may be collected from one or more raw data sources which may comprise information from consumers' banks, mortgagors, lenders, creditors, services, utilities, public records, and other institutions where a consumer holds a financial account. The data may include a status of each account, such as when the last bill was paid, how late a recent payment is or how behind a consumer is on their account, a payment history, the available credit allowed in an account, the account balance, and when an account was opened and/or closed, among other credit information.

Beginning at block 302, a request is received from the user or consumer for consumer credit information. The request may specify, for example, that the user would like to view credit information and comparison of the consumers credit information to a group of high scorers, such as in the sample user interface of FIG. 5A. The request may be transmitted by the computing device 202 to the credit data analysis server 101, for example. The request may be issued by sending it over an electronic wide area network, such as the Internet. The credit bureau receives this request, and may, if necessary, charge and/or authenticate the requestor by methods known in the art.

Then, at block 304, the credit data analysis server 101 accesses consumer credit data associated with the user's request. For example, the accessed data may include credit data, a credit report, and/or associated attributes of the consumer, as well as similar data for one or more high scorers. The data may be retrieved from the credit bureau data store 124 and/or a credit bureau by the data collection module 104, for example. The credit data provided to the data collection module 104 may, in an embodiment, comprise data and/or information precollected from raw data sources.

Also in block 304, the credit data analysis system may, in an embodiment, either access or retrieve cached, precalculated, and/or precompiled credit data specific to a consumer, such as a credit report, score, attributes about the consumer, score factors that apply specific to the consumer, explanatory text related to each attribute/score factor, a positive or negative indication for each score factor. For example, based on information periodically collected by the credit bureau from raw data sources disclosed above, the credit bureau may have precompiled credit information into a credit report and other related credit information in advance.

Alternatively, this information may be determined based on information accessed and compiled in block 304. For example, in some embodiments, the credit bureau and/or the data collection module 104 may use the accessed credit information to calculate a credit score usually based on a proprietary formula. The credit bureau may also calculate and/or create the attributes that are often associated with a credit report. These attributes may be summary variables/attributes (that may correspond to a score factor) that summarize data related to individual accounts. For example, one STAGG attribute (an example type of summary attribute) may be a calculation of the total max credit for all credit card accounts, which may correspond to a score factor. A positive or negative indication, or explanatory text, of each score factor may be determined or accessed based on how the formula uses the score factor to determine its credit score.

Next, at optional block 306, the credit data analysis system may optionally determine a high scorers population of interest. In an embodiment, the user 103 may specify, through the computing device 202, a particular demographic of interest to the user. Such as specification may be included in the request provided to the credit data analysis system. For example, the user 103 may only be interested in comparing their own credit scores and/or attributes to others that are located in a similar geographic region. In another example, the user 103 may only be interested in a comparison with others having a similar income level to the user. Examples of demographics that may be specified may include, but are not limited to, gender, ethnicity, employment status, geographic location, net worth, and income level, among others. Examples of geographic locations that may be specified may include, but are not limited to, a neighborhood, a city, a county, a state, and a country. In an embodiment, one or more demographics may be specified. In an embodiment, the demographic specified may be associated with the user manually and/or automatically. For example, the credit data analysis system may automatically determine (based on the user's credit data, for example), the user's gender, address, and/or income level, among other examples. The system may then automatically specify the relevant demographic, for example, the population of individuals in the user's home state.

At block 308, high scorers values are determined and/or accessed (if they were previously determined). Analysis module 106 may determine high scorers values for relevant demographics (if a demographic populations was specified) using the data retrieved and/or accessed in block 304. As mentioned above, in general, a high scorer is a person who is considered low risk by, for example, banks and/or lenders, and who has an excellent credit score, for example, an overall credit score between 726 and 830. In an embodiment, the term "high scorers" refers to a group of persons who each have excellent credit scores. In another embodiment, "high scorers" may refer to a group of persons that, taken together, on average have an excellent credit score. In an embodiment, the group of high scorers may be limited to individuals having associated characteristics that fall within the specified demographic (as described above).

In some embodiments, one or more high scorer's credit statistics may be used to identify characteristics about good credit scores. A high scorer is a broad term, but may refer to a member of the high scorers group that is comprised of a group of consumers that have high credit scores. For example, a threshold credit score such as 726 or above may be selected as a high scorer credit score by an administrator and/or automatically by the credit data analysis system. If a consumer's score is 726 or above, he or she may be considered a member of the high scorers set. Additional factors may also be used to determine if a consumer is a member of the high scorers set, such as whether a consumer is considered low risk by lenders. Additionally, as described above, in the instance in which a demographic population is provided, only those high scorers having the relevant characteristics may be considered part of the high scorers set. In an embodiment, the threshold credit score may be predetermined by the credit data analysis system, a credit bureau, and/or a user of the credit data analysis system (such as the user 103). In an embodiment, the threshold credit score may be 850, 840, 830, 820, 810, 800, 790, 780, 760, 750, 740, 730, 720, 710, 700, 690, 680, 660, 650, 640, 630, 620, 610, 600, 590, 550, and/or any other credit score.

Once the high scorers group or set is determined, in some embodiments the average inputs for a high scorer that are useful for comparison are calculated. For example, some embodiments may determine the average maxed-out credit cards for a high scorer, the average mortgages in good standing for a high scorer, the average amount of public records attributed to a high scorer, the average age of accounts for a high scorer, the average payments missed, the average number of credit inquiries per month, among others. These averages may be based on mean, median, or mode or other complex criteria used to determine a typical value for a member of the high scorers set. The calculated values may be averaged of the entire group of high scorers, for example.

These average values, once calculated, may be used for comparison to a consumer's credit score, such as the credit score of the data collection module 104. For example, if the data collection module 104 has six credit inquiries and a high scorer has typically two credit inquires, showing this comparison to a user may give the user the idea to lower their credit inquiries so that their credit score inputs align more closely to a high scorers, resulting in a potentially higher credit score. In as embodiment, credit scores or score factors are calculated for a number of different credit categories which are described below in reference to FIGS. 5A and 5B. While averages of credit attributes of high scorers are discussed herein, in other embodiments other (or additional) mathematical operations may be applied to aggregate data associated with multiple high scorers, such as an arithmetic mean, median, mode, standard deviation, range, etc., of a group of consumers that meet the high scorers criteria (whether default criteria set by the system or custom criteria set by a consumer).

Comparison either to the threshold credit score for a high scorer, or comparison of the inputs to high scorers can be used to determine whether a user of the simulation or visualization of credit data is on track to be a high scorer, or is already a high scorer. For example, having a number of credit score inputs that are better than a high scorer's input, such as having one credit inquiry per month whereas the average for high scorer's is two, may determine whether a user should be given a special status, such as the title high scorer, or receive a progress indicator or badge indicators that show high scorer status for all, one, or some credit score input categories. Examples of high scorer comparisons may be seen in FIGS. 5A and 5B, which are described below.

In an embodiment, high scorers information is provided from the credit bureau data store 124. For example, high scorers values may be precalculated by the credit bureau and stored in the credit bureau data store 124, where they may be accessed by the data collection module 104. In an embodiment, high scorers values may be cached by the credit data analysis server 101 for rapid reuse.

At block 310, the complied information, including the consumer credit information and scores, and the high scorers values and scores may be transmitted to the computing device 202 for display in a user interface to the user 103. In other embodiments, the actual credit data may not be transmitted to the computing device 202 and, rather, software code (e.g., HTML, Java, Perl, Ruby, Python, etc.) may be transmitted to the computing device 202. For example, code that is usable by the computing device 202 to render the user interface may be transmitted, without transmitting a data structure that separately includes the actual credit data. In some embodiments, the system distinguishes between the initial transmission of credit data required for user interfaces, and subsequent transmissions of user interface data so that it may transmit only portions that are necessary to update a score factor user interface for new credit data. This may be done, for example, using an XMLHttpRequest (XHR) mechanism, a data push interface, or other communication protocols.

Figure 4:
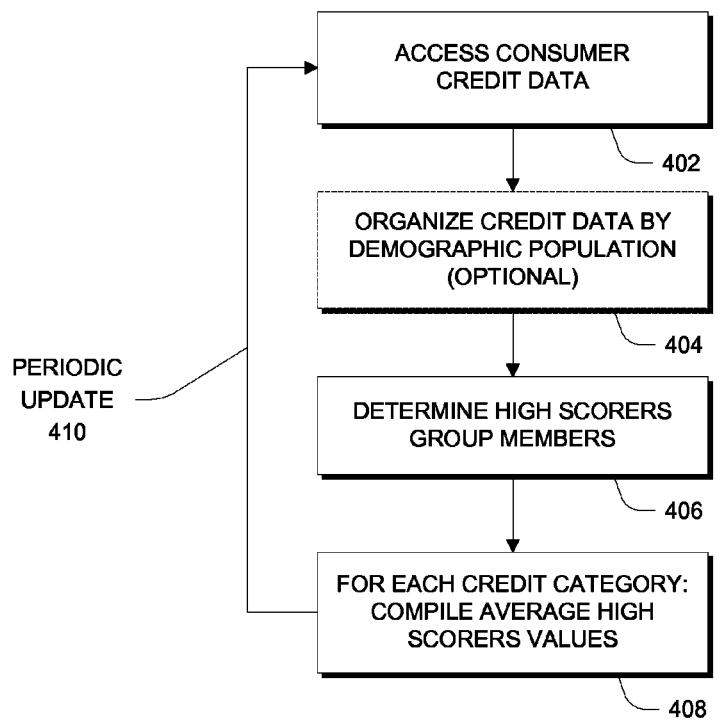
FIG. 4 is a flow diagram depicting an illustrative operation of the credit data analysis system in which high scorer values are determined, according to an embodiment of the present disclosure.

FIG. 4 is a flow diagram depicting an illustrative operation of the credit data analysis system in which high scorer values are determined, according to an embodiment of the present disclosure. In various embodiments, fewer blocks or additional blocks may be included in the process, or various blocks may be performed in an order different from that shown in FIG. 4. In particular, the blocks in FIG. 4 may be performed by computing device 202 and/or credit data analysis server 101 (or any combination thereof), depending on which computing device/software service has access to the required credit data. The process of FIG. 4 may be performed, for example in blocks 304-308 of FIG. 3.

Starting at block 402, consumer credit data is accessed by the credit data analysis system in substantially the same way as described in reference to block 304 of FIG. 3. Then, at optional block 404, if one or more demographic populations have been specified (as described in reference to block 306 of FIG. 3), the accessed credit data is organized according to the demographic. Thus, for example, if the user has specified a geographic location including the State of California, credit data that falls into that geographic location will be assembled.

Next, at block 406, the high scorers group or set members are determined. This step is accomplished substantially as described in reference to block 308 of FIG. 3. In general, only those individuals considered to have excellent credit, and/or to be low risk, are determined to be high scorers. The high scorers group may be further defined by any demographic specification that may have optionally been provided. Continuing with the example above, only individuals who, for example, reside in California may be selected by the credit data analysis system.

At block 408, for each of the credit categories (described above and as further listed and described below) scores of high scorers are calculated from the determined group of high scorers.

In an embodiment, scores of high scorers may periodically be updated, as indicated by the arrow 410. Periodically updating the scores of high scorers provides the user with up-to-date comparisons between their own credit scores and the archetypal scores of high scorers. In an embodiment, the user's scores may also be updated periodically. In an embodiment, the high scorers and/or users scores are updated yearly, quarterly, monthly, weekly, and/or daily, among other time periods.

In an embodiment, credit categories (and/or score factors) may be predetermined by the credit bureau and/or the credit data analysis system. Alternatively, credit categories (and/or score factors) may be determined by the credit data analysis server 101 during the determination of the user's credit scores. For example, the credit data analysis server 101 may determine relevant credit categories based on the specified demographic population, and/or the user's credit data. In an embodiment, more or fewer of the credit categories for which scores are calculated may be displayed to the user.

Example User Interfaces

FIGS. 5A and 5B are illustrative user interfaces of the credit data analysis system, according to embodiments of the present disclosure. The user interfaces may be referred to as score factors user interfaces. The user interfaces include various user interface controls within the score factors user interface, such as score factor user interface panes. In various embodiments, the user interfaces shown in FIGS. 5A and 5B may be presented as a web page, as a mobile application, as a stand-alone application, or by other communication means. For example, the interfaces may be displayed on the computing device 202 (FIG. 5A). In other embodiments, analogous interfaces may be presented using audio or other forms of communication. In an embodiment, the interfaces shown in FIGS. 5A and 5B are configured to be interactive and respond to various user interactions. Such user interactions may include clicks with a mouse, typing with a keyboard, touches and/or gestures on a touch screen, voice commands, and/or the like. As one skilled in the art would recognize, the systems and methods described herein are compatible with various types of input in addition to, or as a replacement for, the touch screen input described.

As described above, FIGS. 5A and 5B illustrate two alternative sample score factors user interfaces (500 and 530) for a specific individual consumer (who in some embodiments may be the user of the client computing device 202). The embodiments of FIGS. 5A and 5B show alternative layouts, which may include listing more or fewer score factors. Various summary attributes/score factors and other data related may be displayed in addition to score factor user interface panes. For example, an area of the user interface may display high scorer information 501 (FIG. 5A), and/or the total number of score factors displayed 534, including the number of helping score factors affecting the specific consumer's score and the number of hurting score factors affecting the specific consumer's score (FIG. 5B). In addition, the user interface may display the consumer's credit score 503 and 532, including a grading of the value of the credit score (such as high, medium, low risk, etc.), and how up-to-date the credit report data being used is regarding this consumer (e.g., how recently the consumer's credit data was downloaded from credit data analysis system or credit bureau). As described above, the factors may be listed by whether they are helping factors or hurting factors 536 (FIG. 5B), or they may be listed in some others assortment (FIG. 5A). In addition, a visual indicator may be associated with helping or hurting factors, such as an up or green color arrow for a helping factor 504, or a down or red color arrow for a hurting factor 510. The user interface may also include the score factor panes such as 502 and 509 (front side displayed), and 512 (reverse side displayed), which may be manipulated as described above.

In this embodiment, high scorers values are displayed next to the user's credit values for each credit category (or score factor). For example, in FIG. 5A the maxed-out credit cards pane 502 indicates the user's score 506 is zero, while the high scorers score 508 is also zero. Thus, because the user's score is the same as the high scorers score, this score factor is contributing positively to the user's overall credit score, and a green up arrow 504 is displayed. In another example, the credit inquiries pane 509 indicates that the user has more credit inquiries than the high scorers, and thus a red down arrow 510 is displayed because this score factor is contributing negatively to the user's overall credit score. In other embodiment, other indicators may indicate whether a score factor is helping or hurting the user's overall credit score. For example, the user interface may include other colored elements (such as colored text) and/or graphics or icons, among other possibilities.

In some embodiments, areas within the score factor user interface panes may be functionally linked to detailed explanatory information and/or information in a consumer's credit report. For example, in FIG. 5A, the user may select the arrow 514 to view additional explanatory information related to that score factor. In another example, for the score factor "You do not have any maxed-out credit cards" 502 displayed in FIG. 5A, the "0" attribute under the "You" text may be linkable to explanatory information and/or more detailed information in the consumer's credit report. By touching or clicking on the "You" or "0" (or any other appropriate related area), a user may be redirected to a second user interface such as the one shown at 512, or to one that shows a consumer's credit accounts, including the consumer's credit cards that are not maxed out under the score factor. In this manner, a user may be able to dive straight into the credit report data that is impacting their credit score in a way described by the score factor.

Score Factor/Summary Data Categories

Score factors (or credit categories) may cover a variety of summary credit categories that affect a user's credit score. For example, score factors may include, but are not limited to, those listed in the table below.

| Positive/Negative Impact on Credit Score | Score Factor Condition/Category of Summary Information ("you" refers to a specific consumer) |
|---|---|
| Negative | You have one or more missed payments. |
| Negative | You have one or more Public Records. |
| Negative | Your average age of accounts is less than 5 years and 11 months. |
| Negative | You have five or more inquiries. |
| Negative | You do not have any open credit cards. |
| Negative | Your average credit card limit is less than $2,000. |

-continued

| Positive/Negative Impact on Credit Score | Score Factor Condition/Category of Summary Information ("you" refers to a specific consumer) |
|---|---|
| Negative | You have three or more installment loans. |
| Negative | You are currently behind on your mortgage. |
| Negative | You have one or more credit cards maxed out. |
| Negative | Your credit-to-debt ratio is more than 51%. |
| Negative | You do not have a mortgage account in good standing. |
| Negative | Your oldest account is less than six months old. |
| Negative | Your credit file hasn't been updated in six months. |
| Positive | You have never missed a payment. |
| Positive | You do not have any Public Records. |
| Positive | Your average age of accounts is more than 7 years and 8 months. |
| Positive | You have less than two inquiries. |
| Positive | You have two or more open credit cards. |
| Positive | Your average credit card limit is more than $5,000. |
| Positive | You have no installment loans. |
| Positive | Your mortgage is in good standing. |
| Positive | You do not have any maxed-out credit cards. |
| Positive | Your Credit Used % is less than 16%. |

In other embodiments, more or fewer score factors may be used. The condition levels may be different in other embodiments. For example, the condition level for a positive impact on a consumer's credit scores based on credit used may be 10%, rather than the 16% listed in the table above.

Each of these score factors may have associated explanatory text that may be viewed in order to reveal more information related to that score factor, such as how the score factor condition is affecting a user's credit score. In some embodiments, the score factor explanatory text may also display a measure of the impact of this particular score factor on your credit score. For example, it may show that, absent this score factor applying to the consumer's credit score, the consumer's credit score would have gone up or done by a certain number of points.

Score Factor Badges and Rewards

In some embodiments, badges may be awarded to a consumer based on the consumer meeting or exceeding the average high scorers score in the score factor categories. Such score badges may be displayed on each score factor user interface pane in the form of an icon. The icon may appear on the score factor user interface pane when the consumer has met score factor related conditions For example, in some embodiments, a consumer may receive a certain badge appearing on a score factor when they meet a preset threshold associated with the score factor value. This preset threshold may correspond to the conditional value required to display the score factor, or, this preset threshold may correspond to a different threshold value. The preset threshold may also correspond to meeting or exceeding a high scorer value. In some embodiments, more than one badge may be associated with a score factor, where each badge corresponds to a different threshold. For example, some score factors may have gold, silver, and bronze badges, where the gold badge may correspond to a score factor threshold value that will give the best effect on the credit score, and the silver and bronze badges correspond to thresholds of lesser positive impact on credit score.

The badges for a consumer may be publicized to a user's Facebook account or twitter (or any other social media or website) via application program interfaces for automatically sending and posting data to those sources, among other methods. In addition, some embodiments may provide an overall "high scorer" status based upon meeting the high scorer thresholds for a set number of score factors, or reaching a certain level of credit score. Some embodiments may also include configurable notifications (SMS, text, email, sound, phone) when awarded a score factor badge or otherwise reaching a score factor threshold.

In some embodiments, badges need not be used, but any reward mechanism may be used to signify to a consumer or the public that the consumer has met predetermined thresholds related to score factor conditions. For example, instead of earning badges, a consumer may receive gift certificates, special promotions and coupons, ribbons, digital property in games, etc.

The badges may be calculated and tracked either on the computing device 202, or by a credit bureau or the credit data analysis system, and transferred to other computing systems such as Facebook via electronic communication over network 108 for additional display.

In an embodiment, the credit data analysis system may, instead of identifying high scorers and providing comparisons between the consumer's score and scores of high scorers, identify low scorers and provide comparisons between the consumer's score and scores of low scorers. For example, the credit data analysis system may identify one or more low scorers as individuals having credit scores below a particular threshold. The credit data analysis system may next determine scores of the low scorers in one or more of various credit categories (in a similar manner as described above in reference to high scorers). Then the credit data analysis system may display the consumer's scores next to the scores of the low scorers for a comparison. In an embodiment, the credit data analysis system may indicate categories (e.g., score factors) in which the consumer's scores are similar to scores of the low scorers, and that are thus hurting the consumer's overall credit score. Similarly, the credit data analysis system may indicate categories (e.g., score factors) in which the consumer's scores are different from scores of the low scorers, and that may not be affecting or helping the consumer's overall credit score. In various embodiment, the credit data analysis system may display the consumer's scores across any number of score factors in comparison scores of high scorers, low scorers, average scorers (e.g., individuals having average scores), and/or any other scorers group along the spectrum from high to low.

Advantageously, the credit data analysis system and the score factor user interface enables a user to compare their own scores in various credit categories to scores of high scorers in the various credit categories. In an embodiment, the credit data analysis system advantageously allows the user to compare the user's scores in various categories with scores of high scorers derived from high scorers of a particular demographic and/or geographic region. Thus, the user may advantageously determine credit categories in which they excel, and in which they lack, as compared to a relevant population of high scorers. Further, scores of high scorers may advantageously be updated periodically, thus providing the user of the credit data analysis system with constantly up-to-date score comparisons.

Depending on the embodiment, certain acts, events, or functions of any of the processes or algorithms described herein may be performed in a different sequence, may be added, may be merged, and/or may be left out altogether (for example, not all described operations or events are necessary for the practice of the process or algorithm). Moreover, in certain embodiments, operations or events may be performed concurrently, for example, through multi-threaded processing, interrupt processing, or multiple processors or processor cores or on other parallel architectures, rather than sequentially.

The various illustrative logical blocks, modules, routines, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

The steps of a method, process, routine, or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of a non-transitory computer-readable storage medium. An example storage medium may be coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method of electronic credit data analysis in an electronic environment, the method comprising:
as implemented by one or more computer systems comprising computer hardware and memory, the one or more computer systems configured with specific executable instructions,
receiving a request from a requestor for an electronic consumer credit analysis;
accessing, from an electronic data store over a network, consumer credit data associated with a plurality of consumers,
wherein the requestor is one of the plurality of consumers;
designating a plurality of high scorers from the plurality of consumers, the plurality of high scorers each having associated credit scores that exceed a predetermined threshold;
calculating, with a processor, for each of one or more credit categories, a high scorers score based at least in part on consumer credit data associated with the plurality of high scorers; and
transmitting, over the network, to the requestor, the electronic consumer credit analysis including the one or more credit categories,
the one or more high scorers scores for the respective credit categories, and consumer credit data associated with the requestor for the respective credit categories.

2. The computer-implemented method of claim 1, wherein calculating a high scorers score for a particular category comprises averaging the consumer credit data of the plurality of high scorers within the particular category.

3. The computer-implemented method of claim 1, wherein the one or more credit categories includes at least one of a number of maxed-out credit cards,
a number of public records, a number of credit inquiries, an average credit card limit, an average age of accounts, a mortgage standing, a number of missed payments, a number of open credit cards, number of installment loans, a credit-to-debt ratio, an oldest account age, and a credit file update time.

4. The computer-implemented method of claim 1, further comprising:
as further implemented by the one or more computer systems,
determining a relevant demographic,
wherein said designating a plurality of high scorers includes designating only high scorers associated with the relevant demographic.

5. The computer-implemented method of claim 4, wherein the relevant demographic includes at least one of an age associated with the requestor, a gender associated with the requestor, an ethnicity associated with the requestor, an employment status associated with the requestor, a geographic location associated with the requestor, a net worth associated with the requestor, and an income level associated with the requestor.

6. The computer-implemented method of claim 4, wherein said relevant demographic comprises a geographic location associated with the requestor, and
wherein the geographic location associated with the requestor includes at least one of a neighborhood in which the requestor lives, a city in which the requestor lives, a county in which the requestor lives, a state in which the requestor lives, and a country in which the requestor lives.

7. The computer-implemented method of claim 1, further comprising:
as further implemented by the one or more computer systems,
causing the electronic consumer credit analysis to be displayed in a user interface on a mobile computing device associated with the requestor.

8. The computer-implemented method of claim 1, further comprising:
determining the one or more credit categories based at least in part on the accessed consumer credit data.

9. The computer-implemented method of claim 1, wherein the high scorers score is periodically recalculated and retransmitted to the requestor.

10. A computer system comprising:
one or more hardware processors in communication with a computer readable medium storing software modules including instructions that are executable by the one or more hardware processors, the software modules including at least:
a user interface module configured to receive, from a consumer,
a request for a credit score analysis;
a data collection module configured to retrieve, from an electronic credit data store, credit information associated with the consumer and a plurality of other consumers; and
an analysis module configured to determine a set of scorers from the plurality of other consumers, and determine, for each of a plurality of score factors, a consumer score and a scorers score,
wherein the user interface module is further configured to provide, to the consumer, an analysis comprising, for each of the plurality of score factors, the consumer score and the scorers score.

11. The computer system of claim 10, wherein the set of scorers comprises at least one of high scorers, low scorers, and average scorers.

12. The computer system of claim 10, wherein the user interface module is further configured to provide, to the consumer, for each of the plurality of score factors, an indication of whether the score factor positively or negatively impacts a credit score of the consumer.

13. The computer system of claim 10, wherein determining a scorers score comprises averaging relevant credit information associated with the set of scorers.

14. The computer system of claim 10, wherein the plurality of score factors includes at least one of a number of maxed-out credit cards, a number of public records, a number of credit inquiries, an average credit card limit, an average age of accounts, a mortgage standing, a number of missed payments, a number of open credit cards, number of installment loans, a credit-to-debt ratio, an oldest account age, and a credit file update time.

15. The computer system of claim 10, wherein the analysis module is further configured to determine a particular demographic, wherein the set of scorers is associated with the particular demographic.

16. The computer system of claim 10, wherein the analysis is displayed in a user interface on a mobile computing device associated with the consumer.

17. The computer system of claim 10, wherein the set of scorers is periodically re-determined.

18. Non-transitory computer storage that comprises executable instructions configured to cause one or more computer processors to perform operations comprising:

receiving first consumer credit information associated with a consumer, wherein the received consumer credit information comprises summary data associated with categories of credit information that impact a credit score of the consumer;

receiving second credit information relating to a plurality of consumers with credit scores above a predetermined threshold, wherein the received second credit information comprises summary data of the plurality of consumers associated with the categories of credit information; and generating, for display on a touch sensitive computing device, a user interface comprising a plurality of panes associated with respective categories of credit information, wherein each pane is configured to provide a comparison between the first consumer credit information associated with the respective category and the second credit information associated with the respective category.

19. The non-transitory computer storage of claim 18, wherein each pane is further configured to provide an indication of whether credit information of the consumer in a respective category positively or negatively impacts the credit score of the consumer.

20. The non-transitory computer storage of claim 18, wherein each of the plurality of consumers is associated with a particular demographic population.

21. The non-transitory computer storage of claim 20, wherein the particular demographic population includes at least one of an age, a gender, an ethnicity, an employment status, a geographic location, a net worth, and an income level.

22. The non-transitory computer storage of claim 21, wherein the particular demographic population is associated with the consumer.

* * * * *